United States Patent
Wang

(10) Patent No.: US 12,231,661 B2
(45) Date of Patent: Feb. 18, 2025

(54) PICTURE TIMING AND DECODING UNIT INFORMATION FOR TEMPORAL SCALABILITY

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 17/702,117

(22) Filed: Mar. 23, 2022

(65) Prior Publication Data

US 2022/0217376 A1 Jul. 7, 2022

Related U.S. Application Data

(63) Continuation of application No. PCT/US2020/051826, filed on Sep. 21, 2020.

(60) Provisional application No. 62/905,147, filed on Sep. 24, 2019.

(51) Int. Cl.
*H04N 19/31* (2014.01)
*H04N 19/70* (2014.01)

(52) U.S. Cl.
CPC ............. *H04N 19/31* (2014.11); *H04N 19/70* (2014.11)

(58) Field of Classification Search
CPC .............................. H04N 19/31; H04N 19/70
See application file for complete search history.

(56) References Cited

U.S. PATENT DOCUMENTS

| | | |
|---|---|---|
| 6,097,842 A | 8/2000 | Suzuki et al. |
| 2008/0013620 A1 | 1/2008 | Hannuksela et al. |
| 2014/0003487 A1 | 1/2014 | Haque et al. |
| 2014/0086332 A1 | 3/2014 | Wang |
| 2014/0086344 A1 | 3/2014 | Wang |
| 2014/0093179 A1 | 4/2014 | Deshpande |
| 2014/0098895 A1 | 4/2014 | Wang |
| 2014/0169448 A1 | 6/2014 | Wang |
| 2014/0301477 A1 | 10/2014 | Deshpande |
| 2014/0355692 A1 | 12/2014 | Ramasubramonian et al. |
| 2015/0016547 A1 | 1/2015 | Tabatabai et al. |
| 2015/0150069 A1 | 5/2015 | Deshpande |

(Continued)

FOREIGN PATENT DOCUMENTS

| | | |
|---|---|---|
| CN | 104662916 A | 5/2015 |
| JP | 2015529033 A | 10/2015 |
| JP | 2015532551 A | 11/2015 |

(Continued)

OTHER PUBLICATIONS

"Line Transmission of Non-Telephone Signals Video Codec for Audiovisual Services At px64 kbits," ITU-T Recommendation H.261, Mar. 1993, 29 pages.

(Continued)

*Primary Examiner* — On S Mung
(74) *Attorney, Agent, or Firm* — Conley Rose, P.C.

(57) ABSTRACT

A method of decoding is provided. The method includes receiving a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers; and decoding the coded picture from the bitstream to obtain a decoded picture. A corresponding method of encoding is also provided.

28 Claims, 12 Drawing Sheets

(56) References Cited

U.S. PATENT DOCUMENTS

2015/0373346 A1    12/2015   Wang
2016/0286219 A1    9/2016   Rusanovskyy

FOREIGN PATENT DOCUMENTS

| | | |
|---|---|---|
| JP | 2016500204 A | 1/2016 |
| RU | 2518904 C2 | 6/2014 |
| RU | 2627098 C2 | 8/2017 |
| RU | 2659733 C2 | 7/2018 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Bross, B., et al., "Versatile Video Coding (Draft 6)," Document: JVET-O2001-vE, Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.

Mathew, M., "Overview of Temporal Scalability With Scalable Video Coding (SVC)," Texas Instruments, Application Report SPRABG3, Nov. 2010, 8 pages.

Deshpande, S., et al., "An Improved Hypothetical Reference Decoder for HEVC," Visual Information Processing and Communication IV, Proc. of SPIE-IS&T Electronic Imaging, SPIE vol. 8666, 866608, Mar. 28, 2013, 9 pages.

Document: JVET-P0202, Drugeon, V., "AHG17: Harmonized HRD parameters signalling for decoding units", Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 456 pages.

Wang, Y-K., "AHG8/AHG17: On buffering period, picture timing, and decoding unit information SEI messages," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Document: JVET-O1130-v3, Hannuksela, M., et al., "AHG8/AHG12: Decoding multiple independent layers with single-layer decoding process", Joint Video Experts Team (JVET) of ITU-T SG 16 WP 3 and ISO/IEC JTC 1/SC 29/ WG 11, 15th Meeting: Gothenburg, SE, Jul. 3-12, 2019, 12 pages.

Wang. Y., et al., "AVS-M: From Standards to Applications," May 2006, vol. 21, No. 3, pp. 332-344, 13 pages.

Kimihiko Kazui, "AHG9: Improvement of HRD for sub-picture based operation," Joint Collaborative Team on Video Coding (JCT-VC) of ITU-T SG 16 WP 3 and ISO/IEC JTC1/SC 29/WG 11, 10th Meeting: Stockholm, SE, Jul. 11-20, 2012, JCTVC-J0136, 10 pages.

Virginie Drugeon, "AHG17: Harmonized HRD parameters signaling", Panasonic, Document: JVET-O0228, Joint Video Experts Team (JVET) of ITU-T SG 16 WP 3 and ISO/IEC JTC 1/SC 29/WG 11, 15th Meeting: Gothenburg, SE, Jul. 3-12, 2019, total 5 pages.

PICTURE TIMING AND DECODING UNIT INFORMATION FOR TEMPORAL SCALABILITY

CROSS-REFERENCE TO RELATED APPLICATIONS

This patent application is a continuation of International Application No. PCT/US2020/051826 filed on Sep. 21, 2020, by Futurewei Technologies, Inc., and titled "Picture Timing And Decoding Unit Information For Temporal Scalability," which claims the benefit of U.S. Provisional Patent Application No. 62/905,147 filed Sep. 24, 2019 by Futurewei Technologies, Inc., and titled "Picture Timing and Decoding Unit Information for Temporal Scalability," each of which is hereby incorporated by reference.

TECHNICAL FIELD

The present disclosure is generally related to video coding, and is specifically related to hypothetical reference decoder (HRD) parameter changes to support efficient encoding and/or conformance testing of multi-layer bitstreams.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method implemented by a video decoder, comprising receiving, by the video decoder, a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers; and decoding, by the video decoder, the coded picture from the bitstream to obtain a decoded picture.

The method provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CPB parameters specify a duration between CPB removal times of two decoding units.

Optionally, in any of the preceding aspects, another implementation of the aspect provides that the SEI message is a picture timing (PT) SEI message.

Optionally, in any of the preceding aspects, another implementation of the aspect provides that the CPB parameters comprise a common CPB removal delay increment and a CPB removal delay increment for an access unit (AU) associated with the PT SEI message.

Optionally, in any of the preceding aspects, another implementation of the aspect provides that the SEI message is a PT SEI message that specifies a number of decoding units in the AU associated with the PT SEI message.

Optionally, in any of the preceding aspects, another implementation of the aspect provides that the SEI message is a PT SEI message that specifies a number of network abstraction layer (NAL) units in a decoding unit (DU) of the AU associated with the PT SEI message.

Optionally, in any of the preceding aspects, another implementation of the aspect provides that the SEI message is a decoding unit information (DUI) SEI message that provides a temporal identifier (ID) of an SEI NAL unit containing the DUI SEI message.

Optionally, in any of the preceding aspects, another implementation of the aspect provides that the temporal ID specifies a highest sublayer for which CPB removal delay information is contained in the DUI SEI message.

Optionally, in any of the preceding aspects, another implementation of the aspect provides displaying the decoded picture on a display of an electronic device.

A second aspect relates to a method implemented by a video encoder, comprising generating, by the video encoder, a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers; performing, by the video encoder, the DU-based HRD operations on the sublayers using the CPB parameters to determine whether the bitstream is conforming; and storing, by the video encoder, the bitstream for communication toward a video decoder when the bitstream is conforming based on performance of the DU-based HRD operations.

The method provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CPB parameters specify a duration between CPB removal times of two decoding units, and wherein the bitstream is conforming when the duration between the CPB removal times is not exceeded.

Optionally, in any of the preceding aspects, another implementation of the aspect provides that the SEI message is a picture timing (PT) SEI message.

Optionally, in any of the preceding aspects, another implementation of the aspect provides that the CPB parameters comprise a common CPB removal delay and a CPB removal delay for an access unit (AU) associated with the PT SEI message.

Optionally, in any of the preceding aspects, another implementation of the aspect provides that the PT SEI message specifies a number of decoding units in the AU associated with the PT SEI message and a number of network abstraction layer (NAL) units in a decoding unit (DU) of the AU associated with the PT SEI message.

Optionally, in any of the preceding aspects, another implementation of the aspect provides that the SEI message is a decoding unit information (DUI) SEI message that provides a temporal identifier (ID) of an SEI NAL unit containing the DUI SEI message.

Optionally, in any of the preceding aspects, another implementation of the aspect provides that the DUI SEI message specifies the temporal ID of a highest sublayer for which CPB removal delay information is contained in the DUI SEI message.

A third aspect relates to a decoding device, comprising a receiver configured to receive a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers; a memory coupled to the receiver, the memory storing instructions; and a processor coupled to the memory, the processor configured to execute the instructions to cause the decoding device to decode the coded picture from the bitstream to obtain a decoded picture.

The decoding device provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CPB parameters specify a duration between CPB removal times of two decoding units.

Optionally, in any of the preceding aspects, another implementation of the aspect provides that the SEI message is a PT SEI message that specifies a number of decoding units in an access unit (AU) associated with the PT SEI message, and wherein the CPB parameters comprise a common CPB removal delay and a CPB removal delay for the AU associated with the PT SEI message.

Optionally, in any of the preceding aspects, another implementation of the aspect provides that the SEI message is a decoding unit information (DUI) SEI message that provides a temporal identifier (ID) of an SEI NAL unit containing the DUI SEI message.

Optionally, in any of the preceding aspects, another implementation of the aspect provides that the temporal ID specifies a highest sublayer for which CPB removal delay information is contained in the DUI SEI message.

A fourth aspect relates to an encoding device, comprising a memory containing instructions; a processor coupled to the memory, the processor configured to implement the instructions to cause the encoding device to: generate a bitstream comprising a coded picture and a supplemental enhancement information (SEI) message, wherein the SEI message includes coded picture buffer (CPB) parameters corresponding to decoding unit (DU)-based HRD operations on sublayers; perform the DU-based HRD operations on the sublayers using the CPB parameters to determine whether the bitstream is conforming; and a transmitter coupled to the processor, the transmitter configured to transmit the video bitstream toward a video decoder when the bitstream is conforming based on performance of the DU-based HRD operations.

The encoding device provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CPB parameters specify a duration between CPB removal times of two decoding units, and wherein the bitstream is conforming when the duration between the CPB removal times is not exceeded.

Optionally, in any of the preceding aspects, another implementation of the aspect provides that the SEI message is a picture timing (PT) SEI message.

Optionally, in any of the preceding aspects, another implementation of the aspect provides that the CPB parameters comprise a common CPB removal delay and a CPB removal delay for an access unit (AU) associated with the PT SEI message.

Optionally, in any of the preceding aspects, another implementation of the aspect provides that the PT SEI message specifies a number of decoding units in the AU associated with the PT SEI message and a number of network abstraction layer (NAL) units in a decoding unit (DU) of the AU associated with the PT SEI message.

Optionally, in any of the preceding aspects, another implementation of the aspect provides that the SEI message is a decoding unit information (DUI) SEI message that provides a temporal identifier (ID) of an SEI network abstraction layer (NAL) unit containing the DUI SEI message.

Optionally, in any of the preceding aspects, another implementation of the aspect provides that the DUI SEI message specifies a temporal identifier (ID) of a highest sublayer for which CPB removal delay information is contained in the DUI SEI message.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display a decoded picture.

A sixth aspect relates to a system. The system includes an encoder; and a decoder in communication with the encoder, wherein the encoder or the decoder includes the decoding device, the encoding device, or the coding apparatus disclosed herein.

The system provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that ensure picture-level coded picture buffer (CPB) parameters corresponding to decoding unit (DU)-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
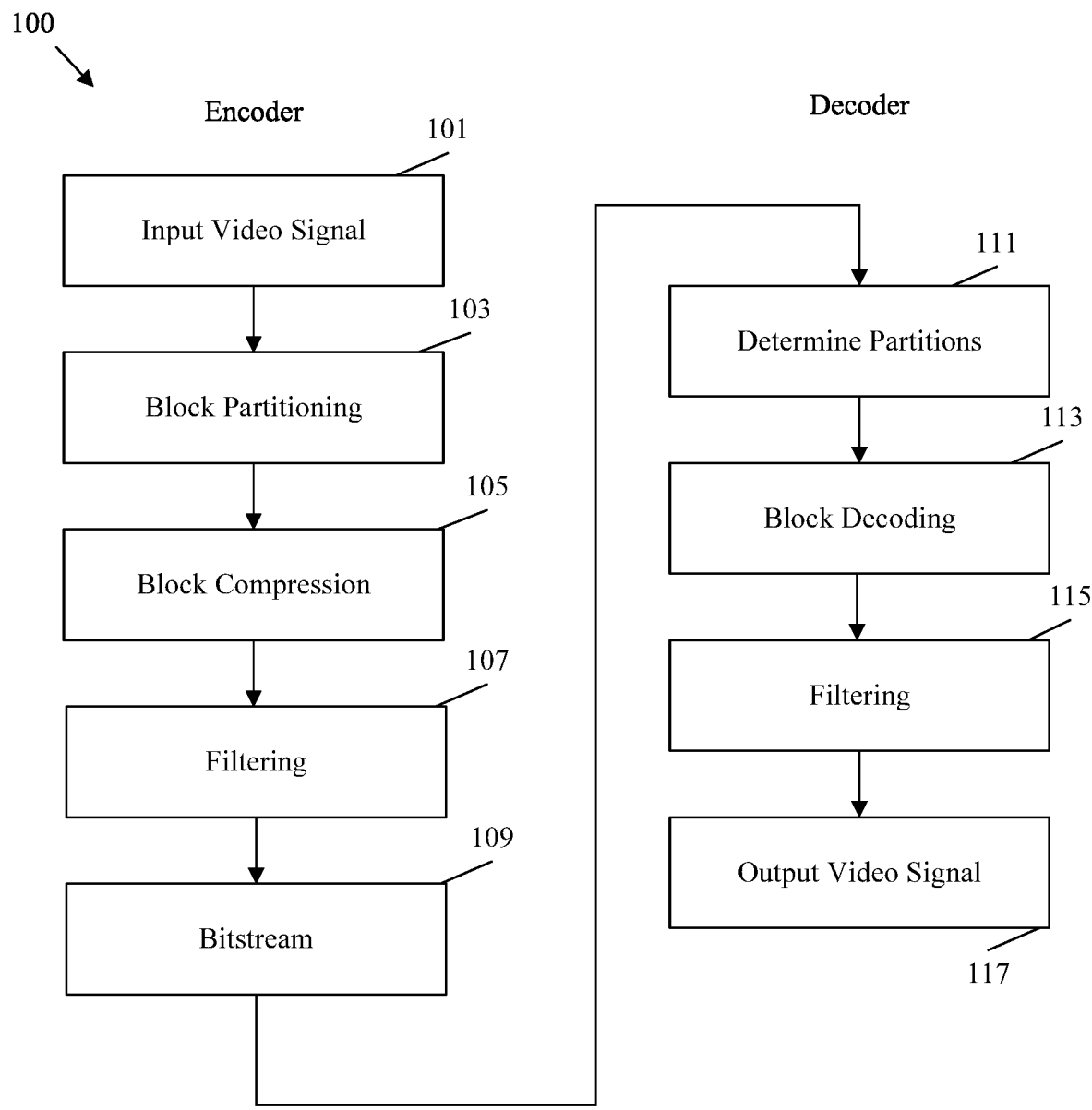
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A network abstraction layer (NAL) unit is a syntax structure containing data in the form of a Raw Byte Sequence Payload (RBSP), an indication of the type of data, and emulation prevention bytes, which are interspersed as desired. A video coding layer (VCL) NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. An access unit (AU) is a set of NAL units that are associated with each other according to a specified classification rule and pertain to one particular output time. A decoding unit (DU) is an AU or a sub-set of an AU and associated non-VCL NAL units. A layer is a set of VCL NAL units that share a specified characteristic (e.g., a common resolution, frame rate, image size, etc.) and associated non-VCL NAL units. A decoding order is an order in which syntax elements are processed by a decoding process. A video parameter set (VPS) is a data unit that contains parameters related to an entire video.

A temporal scalable bitstream is a bitstream coded in multiple layers providing varying temporal resolution/frame rate (e.g., each layer is coded to support a different frame rate). A sublayer is a temporal scalable layer of a temporal scalable bitstream including VCL NAL units with a particular temporal identifier value and associated non-VCL NAL units. For example, a temporal sublayer is a layer that contains video data associated with a specified frame rate. A sublayer representation is a subset of the bitstream containing NAL units of a particular sublayer and the lower sublayers. Hence, one or more temporal sublayers may be combined to achieve a sublayer representation that can be decoded to result in a video sequence with a specified frame rate. An output layer set (OLS) is a set of layers for which one or more layers are specified as output layer(s). An output layer is a layer that is designated for output (e.g., to a display). An OLS index is an index that uniquely identifies a corresponding OLS. A zeroth (0-th) OLS is an OLS that contains only a lowest layer (layer with a lowest layer identifier) and hence contains only an output layer. A temporal identifier (ID) is a data element that indicates data corresponds to temporal location in a video sequence. A sub-bitstream extraction process is a process that removes NAL units from a bitstream that do not belong to a target set as determined by a target OLS index and a target highest temporal ID. The sub-bitstream extraction process results in an output sub-bitstream containing NAL units from the bitstream that are part of the target set.

An HRD is a decoder model operating on an encoder. The HRD checks the variability of bitstreams produced by an encoding process to verify conformance with specified constraints. A bitstream conformance test is a test to determine whether an encoded bitstream complies with a standard, such as Versatile Video Coding (VVC). HRD parameters are syntax elements that initialize and/or define operational conditions of an HRD. Sequence-level HRD parameters are HRD parameters that apply to an entire coded video sequence, while picture-level HRD parameters are HRD parameters that apply to pictures in a coded video sequence.

A maximum HRD temporal ID (Htid) specifies the Temporal ID of the highest sublayer representation for which the HRD parameters are contained in an i-th set of OLS HRD parameters. An operation point (OP) is a temporal subset of an OLS that is identified by an OLS index and a highest temporal ID. A coded picture buffer (CPB) is a first-in first-out buffer in a HRD that contains coded pictures in decoding order for use during bitstream conformance verification. A decoded picture buffer (DPB) is a buffer for holding decoded pictures for reference, output reordering, and/or output delay.

A supplemental enhancement information (SEI) message is a syntax structure with specified semantics that conveys information that is not needed by the decoding process in order to determine the values of the samples in decoded pictures. A buffering period (BP) SEI message is a SEI message that contains HRD parameters for initializing an HRD to manage a CPB. A picture timing (PT) SEI message is a SEI message that contains HRD parameters for managing delivery information for AUs at the CPB and/or the DPB. A decoding unit information (DUI) SEI message is a SEI message that contains HRD parameters for managing delivery information for DUs at the CPB and/or the DPB.

A CPB removal delay is a period of time that a corresponding current AU can remain in the CPB prior to removal and output to a DPB. An initial CPB removal delay is a default CPB removal delay for each picture, AU, and/or DU in a bitstream, OLS, and/or layer. A CPB removal offset is a location in the CPB used to determine boundaries of a corresponding AU in the CPB. An initial CPB removal offset is a default CPB removal offset associated with each picture, AU, and/or DU in a bitstream, OLS, and/or layer. A decoded picture buffer (DPB) output delay information is a period of time that a corresponding AU can remain in the DPB prior to output. A CPB removal delay information is information related to removal of a corresponding DU from the CPB. A delivery schedule specifies timing for delivery of video data to and/or from a memory location, such as a CPB and/or a DPB.

A maximum number of temporal sublayers is a maximum number of sublayers for which the initial CPB removal delay and the initial CPB removal offset are indicated in the BP SEI message. A common CPB removal delay increment specifies the duration, in units of clock sub-ticks, between the nominal CPB removal times of any two consecutive DUs in decoding order in the AU associated with the picture timing SEI message. The common CPB removal delay increment is also used to calculate an earliest possible time of arrival of decoding unit data into the CPB for a hypothetical stream scheduler (HSS).

A number of decoding units specifies the number of DUs in the AU the picture timing SEI message is associated with. A number of NAL units specifies the number of NAL units in the i-th DU of the AU the PT SEI message is associated with. A common CPB removal delay flag specifies whether the syntax elements common CPB removal delay increment are present in the PT SEI message.

A CPB removal delay increment specifies the duration, in units of clock sub-ticks, between the nominal CPB removal times of the (i+1)-th DU and the i-th DU, in decoding order, in the AU associated with the PT SEI message.

A VPS maximum sublayers minus one (vps_max_sublayers_minus1) syntax element is a syntax element that specifies the maximum number of temporal sublayers that may be present in a layer specified by the VPS.

The following acronyms are used herein, Access Unit (AU), Coding Tree Block (CTB), Coding Tree Unit (CTU), Coding Unit (CU), Coded Layer Video Sequence (CLVS), Coded Layer Video Sequence Start (CLVSS), Coded Video Sequence (CVS), Coded Video Sequence Start (CVSS), Joint Video Experts Team (JVET), Hypothetical Reference Decoder (HRD), Motion Constrained Tile Set (MCTS), Maximum Transfer Unit (MTU), Network Abstraction Layer (NAL), Output Layer Set (OLS), Picture Order Count (POC), Random Access Point (RAP), Raw Byte Sequence Payload (RBSP), Sequence Parameter Set (SPS), Video Parameter Set (VPS), Versatile Video Coding (VVC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-O2001-v14.

The latest VVC draft provides specifics for picture timing (PT) SEI messages, decoding unit information (DUI) SEI messages, an AU-based HRD operation (e.g., an HRD operation that applies to the entire AU), and a decoding unit (DU)-based HRD operation (e.g., an HRD operation that applies to one decoding unit, or picture, in the AU).

Picture-level coded picture buffer (CPB) parameters needed for the AU-based HRD operations for both layers and sublayers are signaled in the PT SEI messages. Picture-level CPB parameters needed for DU-based HRD operations for layers are signaled in either the PT SEI message or the DUI SEI message. However, picture-level CPB parameters needed for the DU-based HRD operations for sublayers are missing from the PT SEI message and the DUI SEI message.

Disclosed herein are techniques that ensure picture-level CPB parameters corresponding to DU-based HRD operations on sublayers are included in an SEI message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
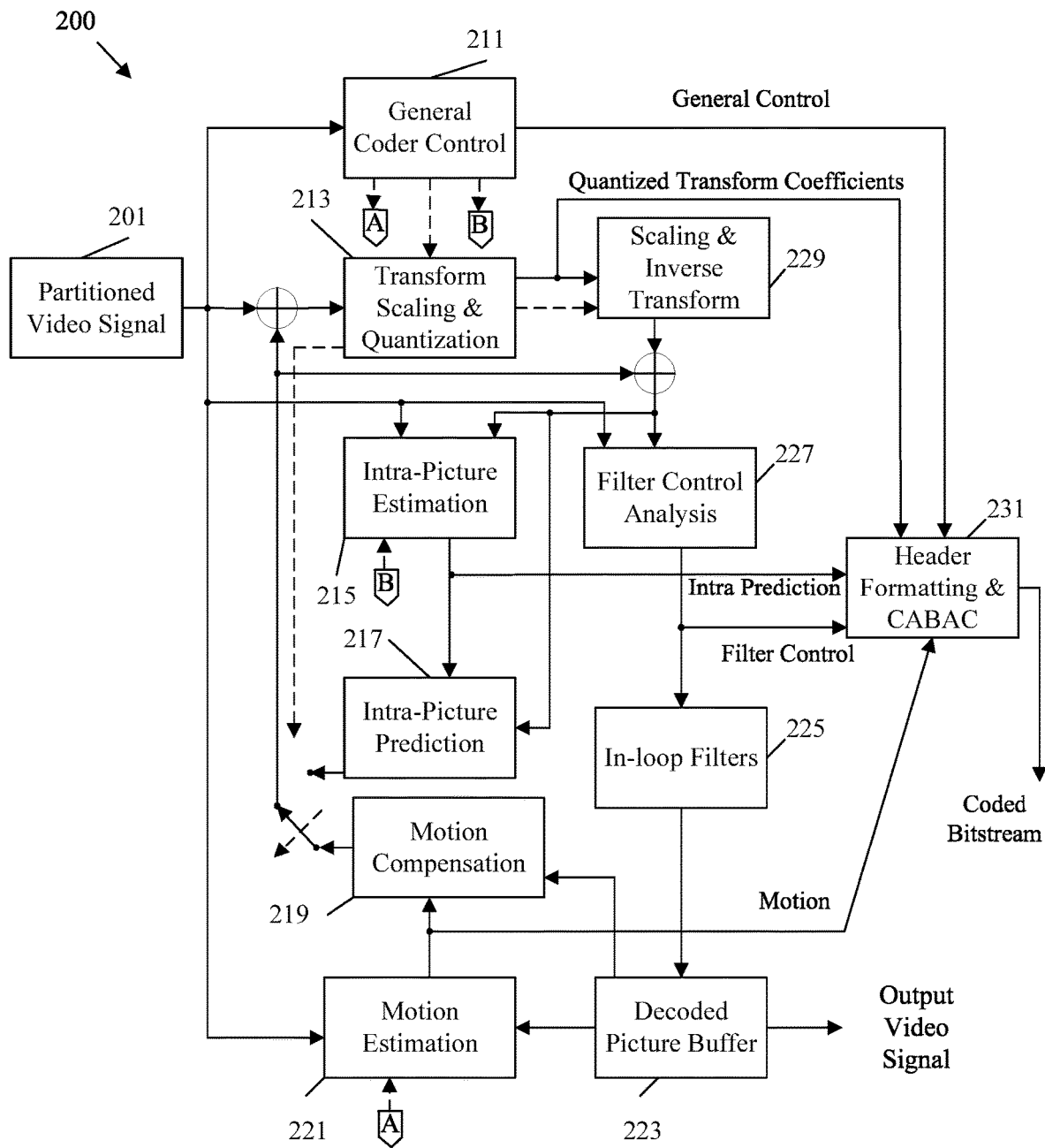
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture.

Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
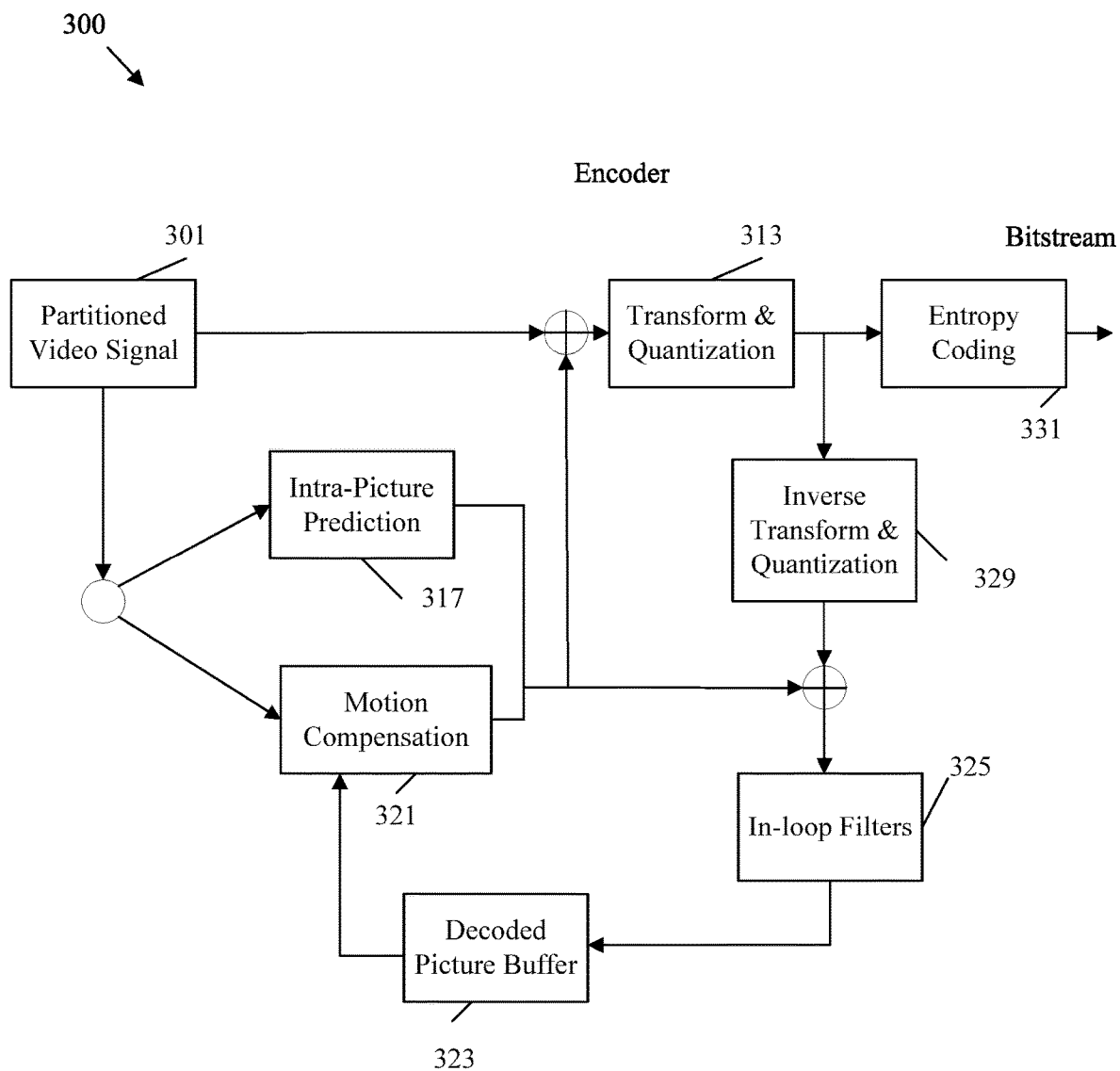
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
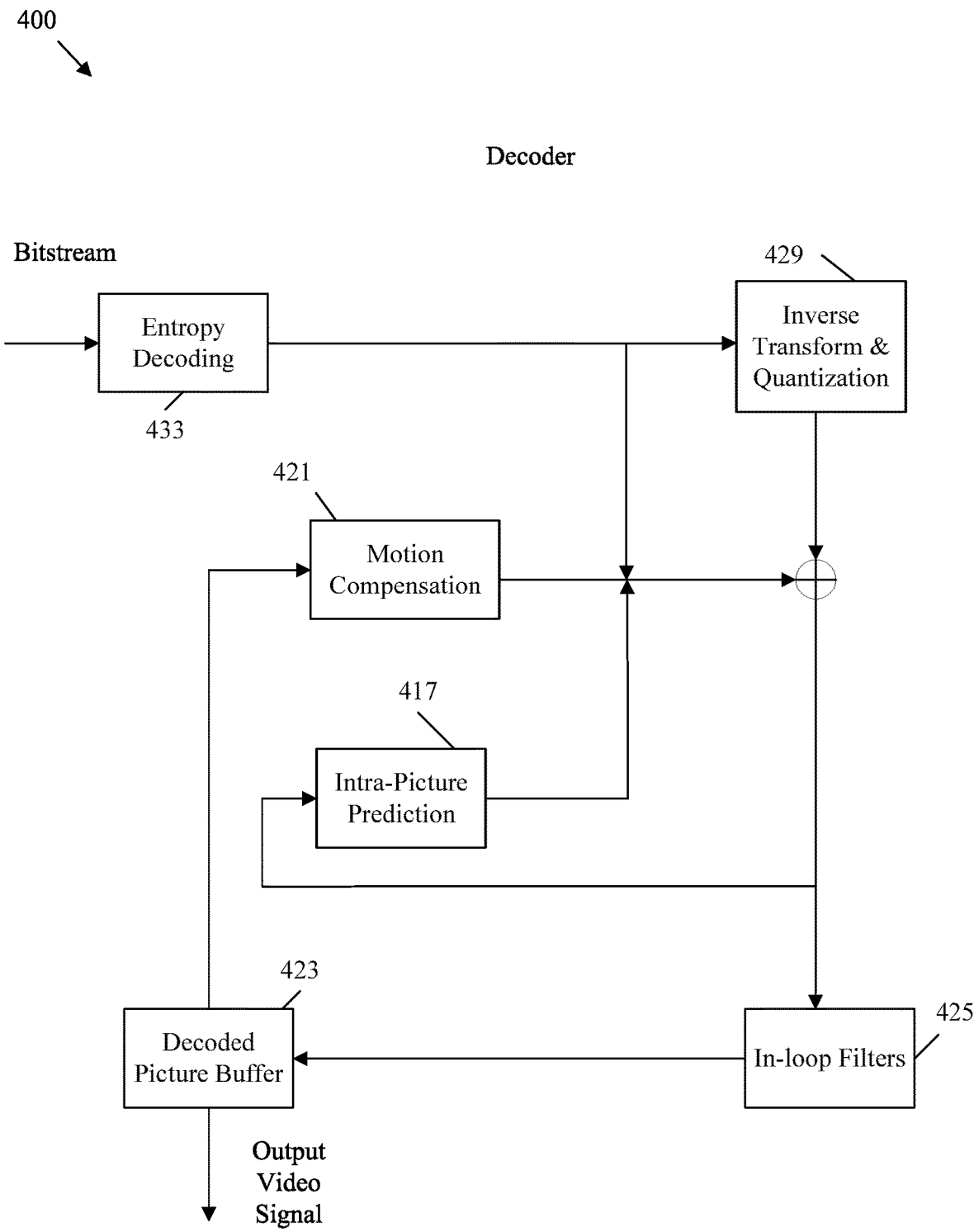
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to an intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
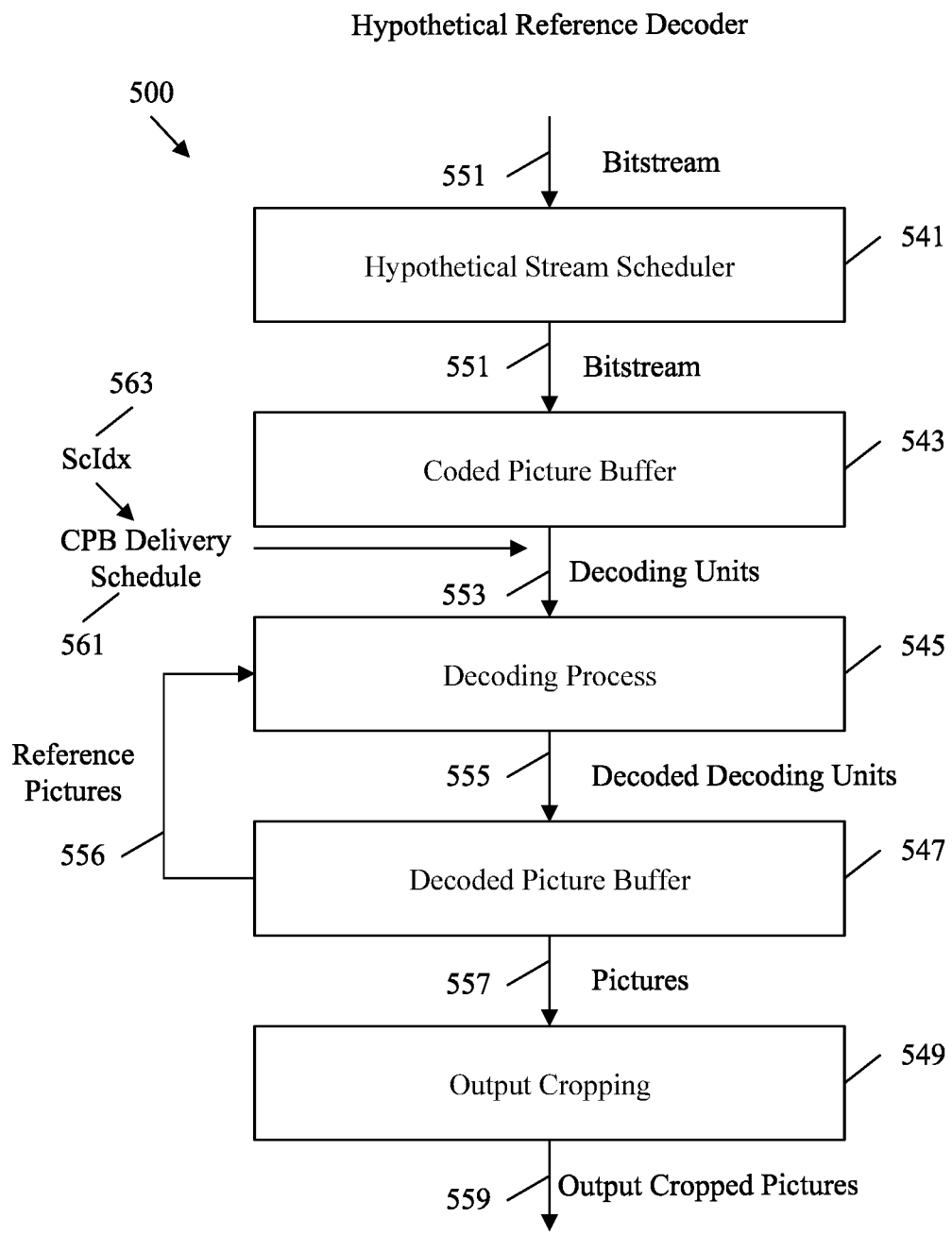
FIG. 5 is a schematic diagram illustrating an example hypothetical reference decoder (HRD).

FIG. 5 is a schematic diagram illustrating an example HRD 500. A HRD 500 may be employed in an encoder, such as codec system 200 and/or encoder 300. The HRD 500 may check the bitstream created at step 109 of method 100 before the bitstream is forwarded to a decoder, such as decoder 400. In some examples, the bitstream may be continuously forwarded through the HRD 500 as the bitstream is encoded. In the event that a portion of the bitstream fails to conform to associated constraints, the HRD 500 can indicate such failure to an encoder to cause the encoder to re-encode the corresponding section of the bitstream with different mechanisms.

The HRD 500 includes a hypothetical stream scheduler (HSS) 541. A HSS 541 is a component configured to perform a hypothetical delivery mechanism. The hypothetical delivery mechanism is used for checking the conformance of a bitstream or a decoder with regards to the timing and data flow of a bitstream 551 input into the HRD 500. For example, the HSS 541 may receive a bitstream 551 output from an encoder and manage the conformance testing process on the bitstream 551. In a particular example, the HSS 541 can control the rate that coded pictures move through the HRD 500 and verify that the bitstream 551 does not contain non-conforming data.

The HSS 541 may forward the bitstream 551 to a CPB 543 at a predefined rate. The HRD 500 may manage data in decoding units (DU) 553. A DU 553 is an AU or a sub-set of an AU and associated non-video coding layer (VCL) network abstraction layer (NAL) units. Specifically, an AU contains one or more pictures associated with an output time. For example, an AU may contain a single picture in a single layer bitstream, and may contain a picture for each layer in a multi-layer bitstream. Each picture of an AU may be divided into slices that are each included in a corresponding VCL NAL unit. Hence, a DU 553 may contain one or more pictures, one or more slices of a picture, or combinations thereof. Also, parameters used to decode the AU, pictures, and/or slices can be included in non-VCL NAL units. As such, the DU 553 contains non-VCL NAL units that contain data needed to support decoding the VCL NAL units in the DU 553. The CPB 543 is a first-in first-out buffer in the HRD 500. The CPB 543 contains DUs 553 including video data in decoding order. The CPB 543 stores the video data for use during bitstream conformance verification.

The CPB 543 forwards the DUs 553 to a decoding process component 545. The decoding process component 545 is a component that conforms to the VVC standard. For example, the decoding process component 545 may emulate a decoder 400 employed by an end user. The decoding process component 545 decodes the DUs 553 at a rate that can be achieved by an example end user decoder. If the decoding process component 545 cannot decode the DUs 553 fast enough to prevent an overflow of the CPB 543, then the bitstream 551 does not conform to the standard and should be re-encoded.

The decoding process component 545 decodes the DUs 553, which creates decoded DUs 555. A decoded DU 555 contains a decoded picture. The decoded DUs 555 are forwarded to a DPB 547. The DPB 547 may be substantially similar to a decoded picture buffer component 223, 323, and/or 423. To support inter-prediction, pictures that are marked for use as reference pictures 556 that are obtained from the decoded DUs 555 are returned to the decoding process component 545 to support further decoding. The DPB 547 outputs the decoded video sequence as a series of pictures 557. The pictures 557 are reconstructed pictures that generally mirror pictures encoded into the bitstream 551 by the encoder.

The pictures 557 are forwarded to an output cropping component 549. The output cropping component 549 is configured to apply a conformance cropping window to the pictures 557. This results in output cropped pictures 559. An output cropped picture 559 is a completely reconstructed picture. Accordingly, the output cropped picture 559 mimics what an end user would see upon decoding the bitstream 551. As such, the encoder can review the output cropped pictures 559 to ensure the encoding is satisfactory.

The HRD 500 is initialized based on HRD parameters in the bitstream 551. For example, the HRD 500 may read HRD parameters from a VPS, a SPS, and/or SEI messages. The HRD 500 may then perform conformance testing operations on the bitstream 551 based on the information in such HRD parameters. As a specific example, the HRD 500 may determine one or more CPB delivery schedules 561 from the HRD parameters. A delivery schedule specifies timing for delivery of video data to and/or from a memory location, such as a CPB and/or a DPB. Hence, a CPB delivery schedule 561 specifies timing for delivery of AUs, DUs 553, and/or pictures, to/from the CPB 543. It should be noted that the HRD 500 may employ DPB delivery schedules for the DPB 547 that are similar to the CPB delivery schedules 561.

Video may be coded into different layers and/or OLSs for use by decoders with varying levels of hardware capabilities as well for varying network conditions. The CPB delivery schedules 561 are selected to reflect these issues. Accordingly, higher layer sub-bitstreams are designated for optimal hardware and network conditions and hence higher layers may receive one or more CPB delivery schedules 561 that employ a large amount of memory in the CPB 543 and short delays for transfers of the DUs 553 toward the DPB 547. Likewise, lower layer sub-bitstreams are designated for limited decoder hardware capabilities and/or poor network conditions. Hence, lower layers may receive one or more CPB delivery schedules 561 that employ a small amount of memory in the CPB 543 and longer delays for transfers of the DUs 553 toward the DPB 547. The OLSs, layers, sublayers, or combinations thereof can then be tested according to the corresponding delivery schedule 561 to ensure that the resulting sub-bitstream can be correctly decoded under the conditions that are expected for the sub-bitstream. The CPB delivery schedules 561 are each associated with a schedule index (ScIdx) 563. A ScIdx 563 is an index that identifies a delivery schedule. Accordingly, the HRD parameters in the bitstream 551 can indicate the CPB delivery schedules 561 by ScIdx 563 as well as include sufficient data to allow the HRD 500 to determine the CPB delivery schedules 561 and correlate the CPB delivery schedules 561 to the corresponding OLSs, layers, and/or sublayers.

Figure 6:
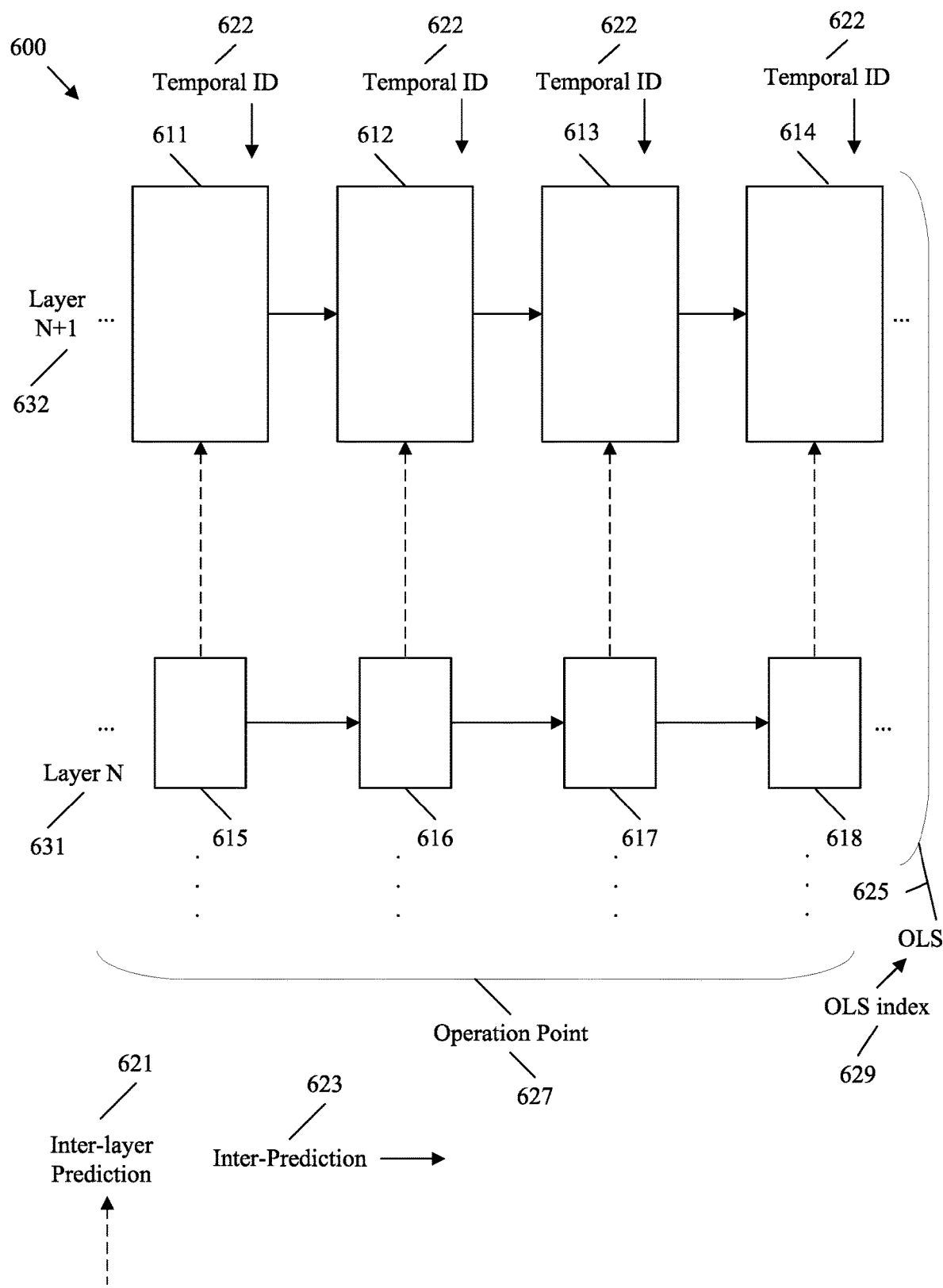
FIG. 6 is a schematic diagram illustrating an example multi-layer video sequence configured for inter-layer prediction.

FIG. 6 is a schematic diagram illustrating an example multi-layer video sequence 600 configured for inter-layer prediction 621. The multi-layer video sequence 600 may be encoded by an encoder, such as codec system 200 and/or encoder 300 and decoded by a decoder, such as codec system 200 and/or decoder 400, for example according to method 100. Further, the multi-layer video sequence 600 can be checked for standard conformance by a HRD, such as HRD 500. The multi-layer video sequence 600 is included to depict an example application for layers in a coded video sequence. A multi-layer video sequence 600 is any video sequence that employs a plurality of layers, such as layer N 631 and layer N+1 632.

In an example, the multi-layer video sequence 600 may employ inter-layer prediction 621. Inter-layer prediction 621 is applied between pictures 611, 612, 613, and 614 and pictures 615, 616, 617, and 618 in different layers. In the example shown, pictures 611, 612, 613, and 614 are part of layer N+1 632 and pictures 615, 616, 617, and 618 are part of layer N 631. A layer, such as layer N 631 and/or layer N+1 632, is a group of pictures that are all associated with a similar value of a characteristic, such as a similar size, quality, resolution, signal to noise ratio, capability, etc. A layer may be defined formally as a set of VCL NAL units and associated non-VCL NAL units. A VCL NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations.

In the example shown, layer N+1 632 is associated with a larger image size than layer N 631. Accordingly, pictures 611, 612, 613, and 614 in layer N+1 632 have a larger picture size (e.g., larger height and width and hence more samples) than pictures 615, 616, 617, and 618 in layer N 631 in this example. However, such pictures can be separated between layer N+1 632 and layer N 631 by other characteristics. While only two layers, layer N+1 632 and layer N 631, are shown, a set of pictures can be separated into any number of layers based on associated characteristics. Layer N+1 632 and layer N 631 may also be denoted by a layer ID. A layer ID is an item of data that is associated with a picture and denotes the picture is part of an indicated layer. Accordingly, each picture 611-618 may be associated with a corresponding layer ID to indicate which layer N+1 632 or layer N 631 includes the corresponding picture. For example, a layer ID may include a NAL unit header layer identifier (nuh layer id), which is a syntax element that specifies an identifier of a layer that includes a NAL unit (e.g., that include slices and/or parameters of the pictures in a layer). A layer associated with a lower quality/bitstream size, such as layer N 631, is generally assigned a lower layer ID and is referred to as a lower layer. Further, a layer associated with a higher quality/bitstream size, such as layer N+1 632, is generally assigned a higher layer ID and is referred to as a higher layer.

Pictures 611-618 in different layers 631-632 are configured to be displayed in the alternative. As such, pictures in different layers 631-632 can share a temporal ID 622 as long as the pictures are included in the same AU. A temporal ID 622 is a data element that indicates data corresponds to temporal location in a video sequence. An AU is a set of NAL units that are associated with each other according to a specified classification rule and pertain to one particular output time. For example, an AU may include one or more pictures in different layers, such as picture 611 and picture 615 when such pictures are associated with the same temporal ID 622. As a specific example, a decoder may decode and display picture 615 at a current display time if a smaller picture is desired or the decoder may decode and display picture 611 at the current display time if a larger picture is desired. As such, pictures 611-614 at higher layer N+1 632 contain substantially the same image data as corresponding pictures 615-618 at lower layer N 631 (notwithstanding the difference in picture size). Specifically, picture 611 contains substantially the same image data as picture 615, picture 612 contains substantially the same image data as picture 616, etc.

Pictures 611-618 can be coded by reference to other pictures 611-618 in the same layer N 631 or N+1 632. Coding a picture in reference to another picture in the same layer results in inter-prediction 623. Inter-prediction 623 is depicted by solid line arrows. For example, picture 613 may be coded by employing inter-prediction 623 using one or two of pictures 611, 612, and/or 614 in layer N+1 632 as a reference, where one picture is referenced for unidirectional inter-prediction and/or two pictures are referenced for bidirectional inter-prediction. Further, picture 617 may be coded by employing inter-prediction 623 using one or two of pictures 615, 616, and/or 618 in layer N 631 as a reference, where one picture is referenced for unidirectional inter-prediction and/or two pictures are referenced for bidirectional inter-prediction. When a picture is used as a reference for another picture in the same layer when performing inter-prediction 623, the picture may be referred to as a reference picture. For example, picture 612 may be a reference picture used to code picture 613 according to inter-prediction 623. Inter-prediction 623 can also be referred to as intra-layer prediction in a multi-layer context. As such, inter-prediction 623 is a mechanism of coding samples of a current picture by reference to indicated samples in a reference picture that is different from the current picture where the reference picture and the current picture are in the same layer.

Pictures 611-618 can also be coded by reference to other pictures 611-618 in different layers. This process is known as inter-layer prediction 621, and is depicted by dashed arrows. Inter-layer prediction 621 is a mechanism of coding samples of a current picture by reference to indicated samples in a reference picture where the current picture and the reference picture are in different layers and hence have different layer IDs. For example, a picture in a lower layer N 631 can be used as a reference picture to code a corresponding picture at a higher layer N+1 632. As a specific example, picture 611 can be coded by reference to picture 615 according to inter-layer prediction 621. In such a case, the picture 615 is used as an inter-layer reference picture. An inter-layer reference picture is a reference picture used for inter-layer prediction 621. In most cases, inter-layer prediction 621 is constrained such that a current picture, such as picture 611, can only use inter-layer reference picture(s) that are included in the same AU and that are at a lower layer, such as picture 615. When multiple layers (e.g., more than two) are available, inter-layer prediction 621 can encode/decode a current picture based on multiple inter-layer reference picture(s) at lower levels than the current picture.

A video encoder can employ a multi-layer video sequence 600 to encode pictures 611-618 via many different combinations and/or permutations of inter-prediction 623 and inter-layer prediction 621. For example, picture 615 may be coded according to intra-prediction. Pictures 616-618 can then be coded according to inter-prediction 623 by using picture 615 as a reference picture. Further, picture 611 may be coded according to inter-layer prediction 621 by using picture 615 as an inter-layer reference picture. Pictures 612-614 can then be coded according to inter-prediction 623 by using picture 611 as a reference picture. As such, a reference picture can serve as both a single layer reference picture and an inter-layer reference picture for different coding mechanisms. By coding higher layer N+1 632 pictures based on lower layer N 631 pictures, the higher layer N+1 632 can avoid employing intra-prediction, which has much lower coding efficiency than inter-prediction 623 and inter-layer prediction 621. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

In order to perform such operations, layers such as layer N 631 and layer N+1 632 may be included in an OLS 625. An OLS 625 is a set of layers for which one or more layers are specified as an output layer. An output layer is a layer that is designated for output (e.g., to a display). For example, layer N 631 may be included solely to support inter-layer prediction 621 and may never be output. In such a case, layer N+1 632 is decoded based on layer N 631 and is output. In such a case, the OLS 625 includes layer N+1 632 as the output layer. When an OLS 625 contains only an output layer, the OLS 625 is referred to as a 0-th OLS. A 0-th OLS is an OLS that contains only a lowest layer (layer with a lowest layer identifier) and hence contains only an output layer. In other cases, an OLS 625 may contain many layers in different combinations. For example, an output layer in an OLS 625 can be coded according to inter-layer prediction 621 based on a one, two, or many lower layers. Further, an OLS 625 may contain more than one output layer. Hence, an OLS 625 may contain one or more output layers and any supporting layers needed to reconstruct the output layers. A multi-layer video sequence 600 can be coded by employing many different OLSs 625 that each employ different combinations of the layers. The OLSs 625 are each associated with an OLS index 629, which is an index that uniquely identifies a corresponding OLS 625.

Checking a multi-layer video sequence 600 for standards conformance at a HRD 500 can become complicated depending on the number of layers 631-632 and OLSs 625. A HRD 500 may segregate the multi-layer video sequence 600 into a sequence of operation points 627 for testing. An operation point 627 is a temporal subset of an OLS 625 that is identified by an OLS index 629 and a highest temporal ID 622. As a specific example, a first operation point 627 could include all pictures in a first OLS 625 from temporal ID zero to temporal ID two hundred, a second operation point 627 could include all pictures in the first OLS 625 from temporal ID two hundred and one to temporal ID four hundred, etc. The operation point 627 selected for testing at a specified instant is referred to as an OP under test (targetOp). Hence, a targetOp is an operation point 627 that is selected for conformance testing at a HRD 500.

Figure 7:
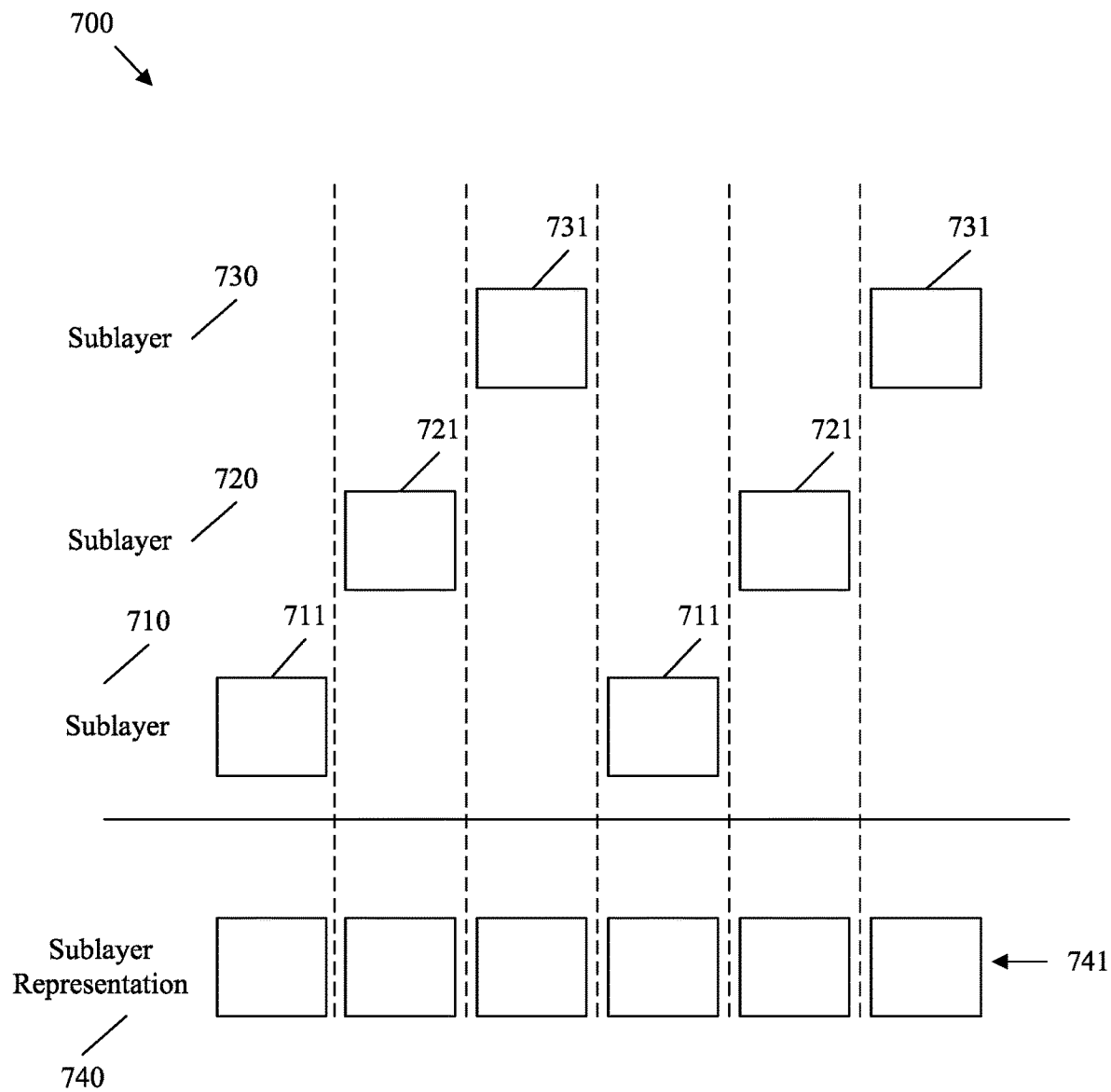
FIG. 7 is a schematic diagram illustrating an example multi-layer video sequence configured for temporal scalability.

FIG. 7 is a schematic diagram illustrating an example multi-layer video sequence 700 configured for temporal scalability. The multi-layer video sequence 700 may be encoded by an encoder, such as codec system 200 and/or encoder 300 and decoded by a decoder, such as codec system 200 and/or decoder 400, for example according to method 100. Further, the multi-layer video sequence 700 can be checked for standard conformance by a HRD, such as HRD 500. The multi-layer video sequence 700 is included to depict another example application for layers in a coded video sequence. For example, the multi-layer video sequence 700 may be employed as a separate embodiment or may be combined with the techniques described with respect to the multi-layer video sequence 600.

The multi-layer video sequence 700 includes sublayers 710, 720, and 730. A sublayer is a temporal scalable layer of a temporal scalable bitstream that includes VCL NAL units (e.g., pictures) with a particular temporal identifier value as well as associated non-VCL NAL units (e.g., supporting parameters). The sublayer 710 may be referred to as a base layer and sublayers 720 and 730 may be referred to as enhancement layers. As shown, the sublayer 710 includes pictures 711 at a first frame rate, such as thirty frames per second. The sublayer 710 is a base layer because the sublayer 710 includes the base/lowest frame rate. The sublayer 720 contains pictures 721 that are temporally offset from the pictures 711 of sublayer 710. The result is that sublayer 710 and sublayer 720 can be combined, which results in a frame rate that is collectively higher than the frame rate of the sublayer 710 alone. For example, sublayer 710 and 720 may have a combined frame rate of sixty frames per second. Accordingly, the sublayer 720 enhances the frame rate of the sublayer 710. Further, sublayer 730 contains pictures 731 that are also temporally offset from the pictures 721 and 711 of sublayers 720 and 710. As such, the sublayer 730 can be combined with sublayers 720 and 710 to further enhance the sublayer 710. For example, the sublayers 710, 720, and 730 may have a combined frame rate of ninety frames per second.

A sublayer representation 740 can be dynamically created by combining sublayers 710, 720, and/or 730. A sublayer representation 740 is a subset of a bitstream containing NAL units of a particular sublayer and the lower sublayers. In the example shown, the sublayer representation 740 contains pictures 741, which are the combined pictures 711, 721, and 731 of sublayers 710, 720, and 730. Accordingly, the multi-layer video sequence 700 can be temporally scaled to a desired frame rate by selecting a sublayer representation 740 that includes a desired set of sublayers 710, 720, and/or 730. A sublayer representation 740 may be created by employing an OLS that includes sublayer 710, 720, and/or 730 as layers. In such a case, the sublayer representation 740 is selected as an output layer. As such, temporal scalability is one of several mechanisms that can be accomplished using multi-layer mechanisms.

Figure 8:
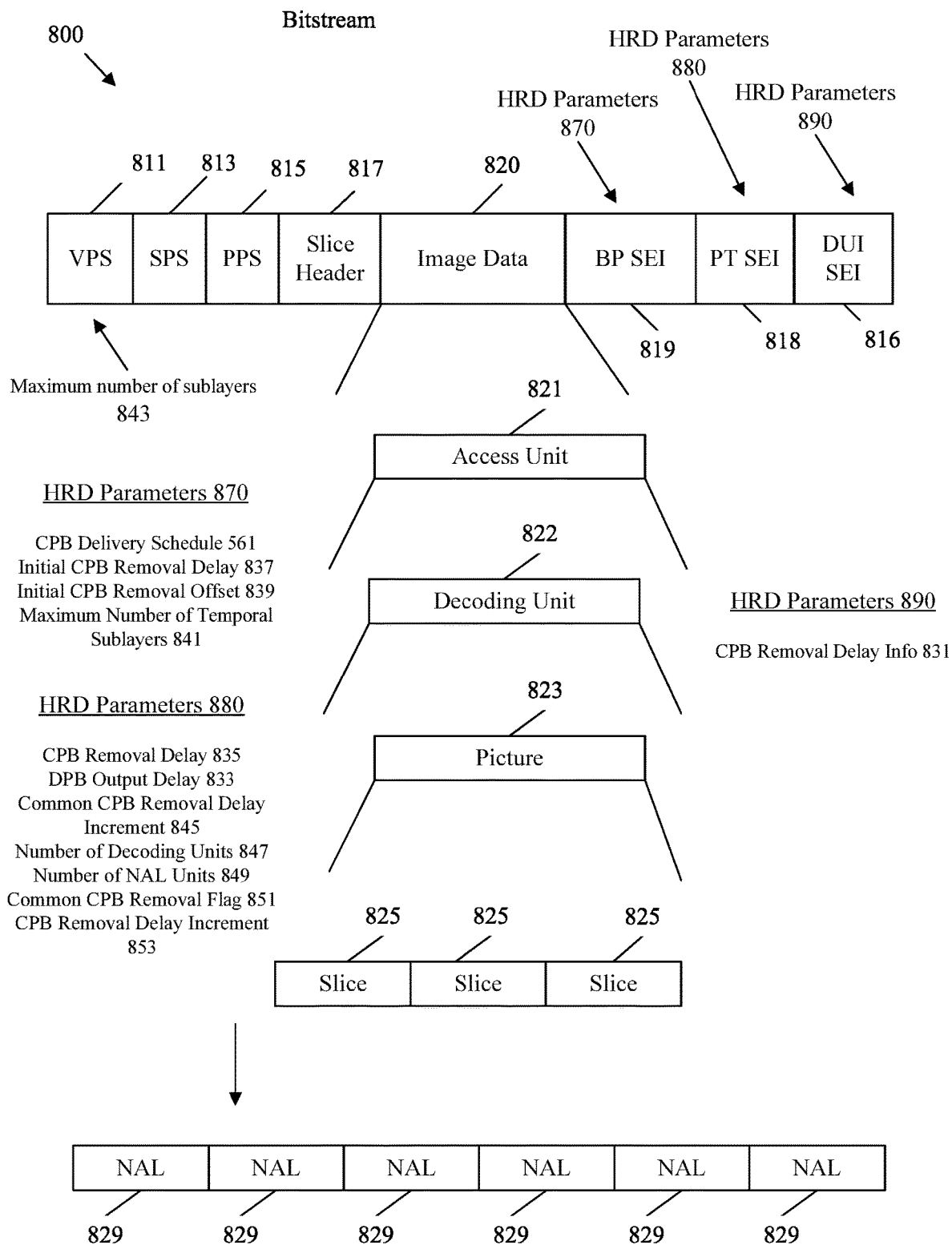
FIG. 8 is a schematic diagram illustrating an example bitstream.

FIG. 8 is a schematic diagram illustrating an example bitstream 800. For example, the bitstream 800 can be generated by a codec system 200 and/or an encoder 300 for decoding by a codec system 200 and/or a decoder 400 according to method 100. Further, the bitstream 800 may include a multi-layer video sequence 600 and/or 700. In addition, the bitstream 800 may include various parameters to control the operation of an HRD, such as HRD 500. Based on such parameters, the HRD can check the bitstream 800 for conformance with standards prior to transmission toward a decoder for decoding.

The bitstream 800 includes a VPS 811, one or more SPSs 813, a plurality of picture parameter sets (PPSs) 815, a plurality of slice headers 817, image data 820, a BP SEI message 819, a PT SEI message 818, and a DUI SEI message 816. A VPS 811 contains data related to the entire bitstream 800. For example, the VPS 811 may contain data related OLSs, layers, and/or sublayers used in the bitstream 800. An SPS 813 contains sequence data common to all pictures in a coded video sequence contained in the bitstream 800. For example, each layer may contain one or more coded video sequences, and each coded video sequence may reference a SPS 813 for corresponding parameters. The parameters in a SPS 813 can include picture sizing, bit depth, coding tool parameters, bit rate restrictions, etc. It should be noted that, while each sequence refers to a SPS 813, a single SPS 813 can contain data for multiple sequences in some examples. The PPS 815 contains parameters that apply to an entire picture. Hence, each picture in the video sequence may refer to a PPS 815. It should be noted that, while each picture refers to a PPS 815, a single PPS 815 can contain data for multiple pictures in some examples. For example, multiple similar pictures may be coded according to similar parameters. In such a case, a single PPS 815 may contain data for such similar pictures. The PPS 815 can indicate coding tools available for slices in corresponding pictures, quantization parameters, offsets, etc.

The slice header 817 contains parameters that are specific to each slice in a picture. Hence, there may be one slice header 817 per slice in the video sequence. The slice header 817 may contain slice type information, POCs, reference picture lists, prediction weights, tile entry points, deblocking parameters, etc. It should be noted that in some examples, a bitstream 800 may also include a picture header, which is a syntax structure that contains parameters that apply to all slices in a single picture. For this reason, a picture header and a slice header 817 may be used interchangeably in some contexts. For example, certain parameters may be moved between the slice header 817 and a picture header depending on whether such parameters are common to all slices in a picture.

The image data 820 contains video data encoded according to inter-prediction and/or intra-prediction as well as corresponding transformed and quantized residual data. For example, the image data 820 may include AUs 821, DUs 822, and/or pictures 823. An AU 821 is a set of NAL units that are associated with each other according to a specified classification rule and pertain to one particular output time. A DU 822 is an AU or a sub-set of an AU and associated non-VCL NAL units. A picture 823 is an array of luma samples and/or an array of chroma samples that create a frame or a field thereof. In plain language, an AU 821 contains various video data that may be displayed at a specified instant in a video sequence as well as supporting syntax data. Hence, an AU 821 may contain a single picture 823 in a single layer bitstream or multiple pictures from multiple layers that are all associated with the same instant in a multi-layer bitstream. Meanwhile, a picture 823 is a coded image that may be output for display or used to support coding of other picture(s) 823 for output. A DU 822 may contain one or more pictures 823 and any supporting syntax data needed for decoding. For example, a DU 822 and an AU 821 may be used interchangeably in simple bitstreams (e.g., when an AU contains a single picture). However, in more complex multi-layer bitstreams (e.g., the bitstream containing the multi-layer video sequence 600), a DU 822 may only contain a portion of the video data from an AU 821. For example, an AU 821 may contain pictures 823 at several layers (e.g., layers 631, 632) and/or sublayers (e.g., sublayers 710, 720, 730) where some of the pictures 823 are associated with different OLSs. In such a case, a DU 822 may only contain picture(s) 823 from a specified OLS and/or a specified layer/sublayer.

A picture 823 contains one or more slices 825. A slice 825 may be defined as an integer number of complete tiles or an integer number of consecutive complete coding tree unit (CTU) rows (e.g., within a tile) of a picture 823 that are exclusively contained in a single NAL unit 829. The slices 825 are further divided into CTUs and/or coding tree blocks (CTBs). A CTU is a group of samples of a predefined size that can be partitioned by a coding tree. A CTB is a subset of a CTU and contains luma components or chroma components of the CTU. The CTUs/CTBs are further divided into coding blocks based on coding trees. The coding blocks can then be encoded/decoded according to prediction mechanisms.

A bitstream 800 is a sequence of NAL units 829. A NAL unit 829 is a container for video data and/or supporting syntax. A NAL unit 829 can be a VCL NAL unit or a non-VCL NAL unit. A VCL NAL unit is a NAL unit 829 coded to contain video data, such as a coded slice 825 and an associated slice header 817. A non-VCL NAL unit is a NAL unit 829 that contains non-video data such as syntax and/or parameters that support decoding the video data, performance of conformance checking, or other operations. For example, a non-VCL NAL unit can contain a VPS 811, a SPS 813, a PPS 815, a BP SEI message 819, a PT SEI message 818, a DUI SEI message 816, or other supporting syntax.

The bitstream 800 can include one or more SEI messages that support conformance testing by an HRD, such as HRD 500. An SEI message is a syntax structure with specified semantics that conveys information not needed by the decoding process in order to determine the values of the samples in decoded pictures. For example, the SEI messages may contain data to support HRD processes or other supporting data that is not directly relevant to decoding the bitstream 800 at a decoder. For example, bitstream 800 may include a BP SEI message 819, a PT SEI message 818, and a DUI SEI message 816.

A BP SEI message 819 is a SEI message that contains HRD parameters 870 for initializing a HRD to manage a CPB. For example, the BP SEI message 819 may contain data describing the CPB delivery schedules, such as CPB delivery schedule 561, that may be employed when performing conformance tests on the bitstream 800. A delivery schedule may be described by a pair of values describing the timing of the delivery schedule (e.g., how often to remove data) and describing the amount of data to be transferred (e.g., how much data to remove at each occurrence). The BP SEI message 819 indicates the AU or DU that should be the starting point of the conformance check (e.g., an AU 821 or a DU 822) and a data pair indicating the default schedule to use for each data unit. In a specific example, the BP SEI message 819 may include an initial CPB removal delay 837 and an initial CPB removal offset 839. An initial CPB removal delay 837 is a default CPB removal delay for each picture, AU, and/or DU in a bitstream, OLS, and/or layer. An initial CPB removal offset 839 is a default CPB removal offset associated with each picture, AU, and/or DU in a bitstream, OLS, and/or layer. By employing the initial CPB removal delay 837 and the initial CPB removal offset 839 pair, a HRD can determine a CPB delivery schedule to use when removing data units (AUs or DUs) from the CPB during conformance testing.

In an embodiment, the BP SEI message 819 includes a maximum number of temporal sublayers 841 for which the initial CPB removal delay 837 and the initial CPB removal offset 839 are indicated in the BP SEI message 819. This maximum number of temporal sublayers 841 is designated bp_max_sublayers_minus1. The value of bp_max_sublayers_minus1 shall be in the range of 0 to a maximum number of sublayers 843 specified in the VPS 811, which is designated vps_max_sublayers_minus1, inclusive. vps_max_sublayers_minus1 plus 1 specifies the maximum number of temporal sublayers that may be present in a layer specified by the VPS 811. The value of vps_max_sublayers_minus1 shall be in the range of 0 to 6, inclusive.

A PT SEI message 818 is a SEI message that contains HRD parameters 880 (a.k.a., picture level CPB parameters) for managing delivery information for AUs at the CPB and/or the DPB. For example, a PT SEI message 818 may contain additional parameters for use in performing a HRD conformance test on a corresponding AU. In a specific example, the PT SEI message 818 may contain a CPB removal delay 835 and a DPB output delay 833. A CPB removal delay 835 is period of time that a corresponding current AU can remain in the CPB prior to removal and output to a DPB. For example, the CPB removal delay 835 may be used to calculate the number of clock ticks between the removal of the current AU and a preceding AU in decoding order where the preceding AU is associated with a BP SEI message 819. Accordingly, the CPB removal delay 835 indicates that a removal delay for a current AU is different than the default removal delay described by the initial CPB removal delay 837 in the BP SEI message 819. Further, the CPB removal delay 835 contains a value of the difference of the removal delay for a current AU from the default value. A DPB output delay 833 is information describing a period of time that a corresponding AU can remain in the DPB prior to output. Specifically, the DPB output delay 833 may be employed to determine an output time of a picture from the DPB, and hence the amount of time the picture/AU can remain in the DPB after removal from the CPB. The output time at the HRD corresponds with an expected output of a picture for display at a decoder.

In an embodiment, the PT SEI message 818 includes a common CPB removal delay increment 845, which is designated pt_du_common_cpb_removal_delay_increment_minus1. The common CPB removal delay increment 845 plus 1 specifies the duration, in units of clock sub-ticks, between the nominal CPB removal times of any two consecutive DUs (e.g., DUs 822) in decoding order in the AU (e.g., AU 821) associated with the picture timing SEI message 818 when Htid i is equal to i, where Htid identifies the highest temporal sublayer to be decoded. This value is also used to calculate an earliest possible time of arrival of decoding unit data into the CPB for a hypothetical stream scheduler (HSS). The length of this syntax element is du_cpb_removal_delay_increment_length_minus1+1 bits.

In an embodiment, the PT SEI message 818 includes a number of decoding units 847, which is designated pt_num_decoding_units_minus1. The number of decoding units 847 plus 1 specifies the number of DUs (e.g., DUs 822) in the AU (e.g., AU 821) the picture timing SEI message 818 is associated with. The value of num_decoding_units_minus1 shall be in the range of 0 to PicSizeInCtbsY−1, inclusive. In an embodiment, the PicSizeInCtbsY syntax element represents a size of a picture measured in CTBs (e.g., a width of the picture measured in CTBs x a height of the picture measured in CTBs).

In an embodiment, the PT SEI message 818 includes a number of NAL units 849 in the i-th DU of the AU the PT SEI message 818 is associated with. The number of NAL units 849 is designated as pt_num_nalus_in_du_minus1[i]. The value of pt_num_nalus_in_du_minus1[i] shall be in the range of 0 to PicSizeInCtbsY−1, inclusive.

In an embodiment, the PT SEI message 818 includes a common CPB removal delay flag 851, which is designated as pt_du_common_cpb_removal_delay_flag. The common CPB removal delay flag 851 equal to 1 specifies that the syntax elements common CPB removal delay increment 845, which are designated as pt_du_common_cpb_removal_delay_increment_minus1[i]), are present in the PT SEI message 818. The DU common CPB removal delay flag 851 equal to 0 specifies that the syntax elements common CPB removal delay increment 845 are not present. When not present in the PT SEI message 818, the common CPB removal delay flag 851 is inferred to be equal to 0.

In an embodiment, the first DU of the AU is the first pt_num_nalus_in_du_minus1[0]+1 consecutive NAL units in decoding order in the AU. The i-th (with i greater than 0) DU of the AU is the pt_num_nalus_in_du_minus1[i]+1 consecutive NAL units immediately following the last NAL unit in the previous DU of the AU, in decoding order. In an embodiment, there is at least one VCL NAL unit in each DU, and all non-VCL NAL units associated with a VCL NAL unit are included in the same DU as the VCL NAL unit.

In an embodiment, the PT SEI message 818 includes a CPB removal delay increment 853, which is designated pt_du_cpb_removal_delay_increment_minus1. The CPB removal delay increment 853 plus 1 specifies the duration, in units of clock sub-ticks, between the nominal CPB removal times of the (i+1)-th DU and the i-th DU, in decoding order, in the AU associated with the PT SEI message 818 when Htid is equal to j. This value is also used to calculate an earliest possible time of arrival of DU data into the CPB for the HSS. The length of this syntax element is bp_du_cpb_removal_delay_increment_length_minus1+1 bits.

In an embodiment, the PT SEI message 818 includes the maximum number of sublayers 843 instead of, or in addition to, the VPS 811.

A DUI SEI message 816 is a SEI message that contains HRD parameters 890 (a.k.a., picture level CPB parameters) for managing delivery information for DUs at the CPB and/or the DPB. For example, the DUI SEI message 816 may contain additional parameters for use in performing a HRD conformance test on a corresponding DU. As noted above, an AU may contain one or more DUs. Hence, information for checking a DU may be different than information for checking an AU. As a specific example, the DUI SEI message 816 may contain CPB removal delay information 831. A CPB removal delay information 831 is information related to removal of a corresponding DU from the CPB. For example, the CPB removal delay information 831 may be used to calculate the number of clock ticks between the removal of the current DU and a preceding DU in decoding order.

In an embodiment, the DUI SEI message 816 includes the maximum number of temporal sublayers 841 for which the initial CPB removal delay 837 and the initial CPB removal offset 839 are indicated in the BP SEI message 819. This maximum number of temporal sublayers 841 is designated bp_max_sublayers_minus1. The value of bp_max_sublayers_minus1 shall be in the range of 0 to a maximum number of sublayers 843 specified in the VPS 811, which is designated vps_max_sublayers_minus1, inclusive. vps_max_sublayers_minus1 plus 1 specifies the maximum number of temporal sublayers that may be present in a layer specified by the VPS 811. The value of vps_max_sublayers_minus1 shall be in the range of 0 to 6, inclusive.

In an embodiment, the DUI SEI message 816 includes the maximum number of sublayers 843 instead of, or in addition to, the VPS 811.

As can be appreciated by the preceding description, the BP SEI message 819, the PT SEI message 818, and the DUI SEI message 816 contain a significant amount of information. In an embodiment, the HRD parameters 880 and/or 890 (a.k.a., picture-level CPB parameters) in the PT SEI message 818 and/or the DUI SEI message 816 are used to perform DU-based HRD operations on sublayers to test for bitstream conformance.

By way of example, an HRD determines, for each layer, whether the duration, as specified in the PT SEI message 818 and/or the DUI SEI message 816, between the nominal CPB removal times of any two consecutive decoding units in decoding order in the access unit associated with the picture timing SEI message is exceeded. When the duration is exceeded, the bitstream does not conform and a new bitstream with revised CPB parameters is generated and tested by the encoder. That process may repeat until the duration is not exceeded, which means that the bitstream conforms to the standard (e.g., the VVC standard).

The HRD may also determine, for each layer, whether the duration, as specified in the PT SEI message 818 and/or the DUI SEI message 816, between the CPB removal times of the (i+1)-th decoding unit and the i-th decoding unit, in decoding order, in the access unit associated with the picture timing SEI message is exceeded. When the duration is exceeded, the bitstream does not conform and a new bitstream with revised CPB parameters is generated and tested by the encoder. That process may repeat until the duration is not exceeded, which means that the bitstream conforms to the standard (e.g., the VVC standard).

Once a conforming bitstream is obtained, that bitstream may be stored and communicated toward the decoder. In an embodiment, the BP SEI message 819, the PT SEI message 818, and the DUI SEI message 816 remain included in the bitstream even though the decoder may not use this information in decoding any of the pictures included in the bitstream.

An example implementation of the HRD using the DU-based HRD operations to test the sublayers in the bitstream for bitstream conformance is provided in the following syntax and semantics.

A picture timing SEI message syntax is as follows.

|  | Descriptor |
|---|---|
| pic_timing( payloadSize ) { |  |
|   pt_max_sub_layers_minus1 | u(3) |
|   cpb_removal_delay_minus1[ pt_max_sub_layers_minus1 ] | u(v) |
|   for( i = TemporalId; i < pt_max_sub_layers_minus1; i++ ) { |  |
|     sub_layer_delays_present_flag[ i ] | u(1) |
|     if( sub_layer_delays_present_flag[ i ] ) { |  |
|       cpb_removal_delay_delta_enabled_flag[ i ] | u(1) |
|       if( cpb_removal_delay_delta_enabled_flag[ i ] ) |  |
|         cpb_removal_delay_delta_idx[ i ] | u(v) |
|       else |  |
|         cpb_removal_delay_minus1[ i ] | u(v) |
|     } |  |
|   } |  |
|   dpb_output_delay | u(v) |
|   if( decoding_unit_hrd_params_present_flag ) |  |
|     pic_dpb_output_du_delay | u(v) |
|   if( decoding_unit_hrd_params_present_flag && |  |
|     decoding_unit_cpb_params_in_pic_timing_sei_flag ) { |  |
|     num_decoding_units_minus1 | ue(v) |
|     du_common_cpb_removal_delay_flag | u(1) |
|     if( du_common_cpb_removal_delay_flag ) |  |
|       for( i = TemporalId; i < pt_max_sub_layers_minus1; i++ ) |  |
|         du_common_cpb_removal_delay_increment_minus1[ i ] | u(v) |
|     for( i = 0; i <= num_decoding_units_minus1; i++ ) { |  |
|       num_nalus_in_du_minus1[ i ] | ue(v) |
|       if( !du_common_cpb_removal_delay_flag && i < num_decoding_units_minus1 ) |  |
|         for( j = TemporalId; j < pt_max_sub_layers_minus1; j++ ) |  |
|           du_cpb_removal_delay_increment_minus1[ i ][ j ] | u(v) |
|     } |  |
|   } |  |
| } |  |

An example of picture timing SEI message semantics is as follows.

The picture timing SEI message provides CPB removal delay and DPB output delay information for the access unit associated with the SEI message.

num_decoding_units_minus1 plus 1 specifies the number of decoding units in the access unit the picture timing SEI message is associated with. The value of num_decoding_units_minus1 shall be in the range of 0 to PicSizeInCtbsY−1, inclusive.

du_common_cpb_removal_delay_flag equal to 1 specifies that the syntax elements du_common_cpb_removal_delay_increment_minus1 [i] are present. du_common_cpb_removal_delay_flag equal to 0 specifies that the syntax elements du_common_cpb_removal_delay_increment_minus1[i] are not present.

du_common_cpb_removal_delay_increment_minus1[i] plus 1 specifies the duration, in units of clock sub-ticks (see clause C.1), between the nominal CPB removal times of any two consecutive decoding units in decoding order in the access unit associated with the picture timing SEI message when Htid i equal to i. This value is also used to calculate an earliest possible time of arrival of decoding unit data into the CPB for the HSS, as specified in Annex C of the VVC standard. The length of this syntax element is du_cpb_removal_delay_increment_length_minus1+1 bits.

num_nalus_in_du_minus1[i] plus 1 specifies the number of NAL units in the i-th decoding unit of the access unit the picture timing SEI message is associated with. The value of num_nalus_in_du_minus1[i] shall be in the range of 0 to PicSizeInCtbsY−1, inclusive.

The first decoding unit of the access unit consists of the first num_nalus_in_du_minus1[0]+1 consecutive NAL units in decoding order in the access unit. The i-th (with i greater than 0) decoding unit of the access unit consists of the num_nalus_in_du_minus1[i]+1 consecutive NAL units immediately following the last NAL unit in the previous decoding unit of the access unit, in decoding order. There shall be at least one VCL NAL unit in each decoding unit. All non-VCL NAL units associated with a VCL NAL unit shall be included in the same decoding unit as the VCL NAL unit.

du_cpb_removal_delay_increment_minus1[i][j] plus 1 specifies the duration, in units of clock sub-ticks, between the nominal CPB removal times of the (i+1)-th decoding unit and the i-th decoding unit, in decoding order, in the access unit associated with the picture timing SEI message when Htid i equal to j. This value is also used to calculate an earliest possible time of arrival of decoding unit data into the CPB for the HSS, as specified in Annex C of the VVC standard. The length of this syntax element is du_cpb_removal_delay_increment_length_minus1+1 bits.

An example decoding unit information SEI message syntax is as follows.

The bitstream (or a part thereof) refers to the bitstream subset (or a part thereof) associated with any of the operation points to which the decoding unit information SEI message applies.

The presence of decoding unit information SEI messages for an operation point is specified as follows.

If CpbDpbDelaysPresentFlag is equal to 1, decoding_unit_hrd_params_present_flag is equal to 1 and decoding_unit_cpb_params_in_pic_timing_sei_flag is equal to 0, one or more decoding unit information SEI messages applicable to the operation point shall be associated with each decoding unit in the CVS.

Otherwise, if CpbDpbDelaysPresentFlag is equal to 1, decoding_unit_hrd_params_present_flag is equal to 1 and decoding_unit_cpb_params_in_pic_timing_sei_flag is equal to 1, one or more decoding unit information SEI messages applicable to the operation point may or may not be associated with each decoding unit in the CVS.

Otherwise (CpbDpbDelaysPresentFlag is equal to 0 or decoding_unit_hrd_params_present_flag is equal to 0), in the CVS there shall be no decoding unit that is associated with a decoding unit information SEI message applicable to the operation point.

The set of NAL units associated with a decoding unit information SEI message consists, in decoding order, of the SEI NAL unit containing the decoding unit information SEI message and all subsequent NAL units in the access unit up to but not including any subsequent SEI NAL unit containing a decoding unit information SEI message with a different value of decoding_unit_idx. Each decoding unit shall include at least one VCL NAL unit. All non-VCL NAL units associated with a VCL NAL unit shall be included in the decoding unit containing the VCL NAL unit.

The TemporalId in the decoding unit information SEI message syntax is the TemporalId of the SEI NAL unit containing the decoding unit information SEI message.

| | Descriptor |
|---|---|
| decoding_unit_info( payloadSize ) { | |
|   decoding_unit_idx | ue(v) |
|   dui_max_sub_layers_minus1 | u(3) |
|   if( !decoding_unit_cpb_params_in_pic_timing_sei_flag ) | |
|     for( i = TemporalId; i < dui_max_sub_layers_minus1; i++ ) | |
|       du_spt_cpb_removal_delay_increment[ i ] | u(v) |
|   dpb_output_du_delay_present_flag | u(1) |
|   if( dpb_output_du_delay_present_flag ) | |
|     pic_spt_dpb_output_du_delay | u(v) |
| } | |

An example of picture timing SEI message semantics is as follows.

The decoding unit information SEI message provides CPB removal delay information for the decoding unit associated with the SEI message.

The following applies for the decoding unit information SEI message syntax and semantics.

The syntax elements decoding_unit_hrd_params_present_flag, decoding_unit_cpb_params_in_pic_timing_sei_flag and dpb_output_delay_du_length_minus1, and the variable CpbDpbDelaysPresentFlag are found in or derived from syntax elements in the general_hrd_parameters( ) syntax structure that is applicable to at least one of the operation points to which the decoding unit information SEI message applies.

decoding_unit_idx specifies the index, starting from 0, to the list of decoding units in the current access unit, of the decoding unit associated with the decoding unit information SEI message. The value of decoding_unit_idx shall be in the range of 0 to PicSizeInCtbsY−1, inclusive.

A decoding unit identified by a particular value of duIdx includes and only includes all NAL units associated with all decoding unit information SEI messages that have decoding_unit_idx equal to duIdx. Such a decoding unit is also referred to as associated with the decoding unit information SEI messages having decoding_unit_idx equal to duIdx.

For any two decoding units duA and duB in one access unit with decoding_unit_idx equal to duIdxA and duIdxB, respectively, where duIdxA is less than duIdxB, duA shall precede duB in decoding order.

A NAL unit of one decoding unit shall not be present, in decoding order, between any two NAL units of another decoding unit.

dui_max_sub_layers_minus1 plus 1 specifies the the TemporalId of the highest sub-layer representation for which the CPB removal delay information is contained in the decoding unit information SEI message. The value of dui_max_sub_layers_minus1 shall be in the range of 0 to vps_max_sub_layers_minus1, inclusive.

du_spt_cpb_removal_delay_increment[i] specifies the duration, in units of clock sub-ticks, between the nominal CPB times of the last decoding unit in decoding order in the current access unit and the decoding unit associated with the decoding unit information SEI message when Htid i equal to i. This value is also used to calculate an earliest possible time of arrival of decoding unit data into the CPB for the HSS, as specified in Annex C. The length of this syntax element is du_cpb_removal_delay_increment_length_minus1+1. When the decoding unit associated with the decoding unit information SEI message is the last decoding unit in the current access unit, the value of du spt_cpb_removal_delay_increment[i] shall be equal to 0.

dpb_output_du_delay_present_flag equal to 1 specifies the presence of the pic_spt_dpb_output_du_delay syntax element in the decoding unit information SEI message. dpb_output_du_delay_present_flag equal to 0 specifies the absence of the pic_spt_dpb_output_du_delay syntax element in the decoding unit information SEI message.

pic_spt_dpb_output_du_delay is used to compute the DPB output time of the picture when DecodingUnitHrdFlag is equal to 1. It specifies how many sub clock ticks to wait after removal of the last decoding unit in an access unit from the CPB before the decoded picture is output from the DPB. When not present, the value of pic_spt_dpb_output_du_delay is inferred to be equal to pic_dpb_output_du_delay. The length of the syntax element pic_spt_dpb_output_du_delay is given in bits by dpb_output_delay_du_length_minus1+1.

It is a requirement of bitstream conformance that all decoding unit information SEI messages that are associated with the same access unit, apply to the same operation point, and have dpb_output_du_delay_present_flag equal to 1 shall have the same value of pic_spt_dpb_output_du_delay.

The output time derived from the pic_spt_dpb_output_du_delay of any picture that is output from an output timing conforming decoder shall precede the output time derived from the pic_spt_dpb_output_du_delay of all pictures in any subsequent CVS in decoding order.

The picture output order established by the values of this syntax element shall be the same order as established by the values of PicOrderCntVal.

For pictures that are not output by the "bumping" process because they precede, in decoding order, a CLVSS picture that has no_output_of_prior_pics_flag equal to 1 or inferred to be equal to 1, the output times derived from pic_spt_dpb_output_du_delay shall be increasing with increasing value of PicOrderCntVal relative to all pictures within the same CVS.

For any two pictures in the CVS, the difference between the output times of the two pictures when DecodingUnitHrdFlag is equal to 1 shall be identical to the same difference when DecodingUnitHrdFlag is equal to 0.

Figure 9:
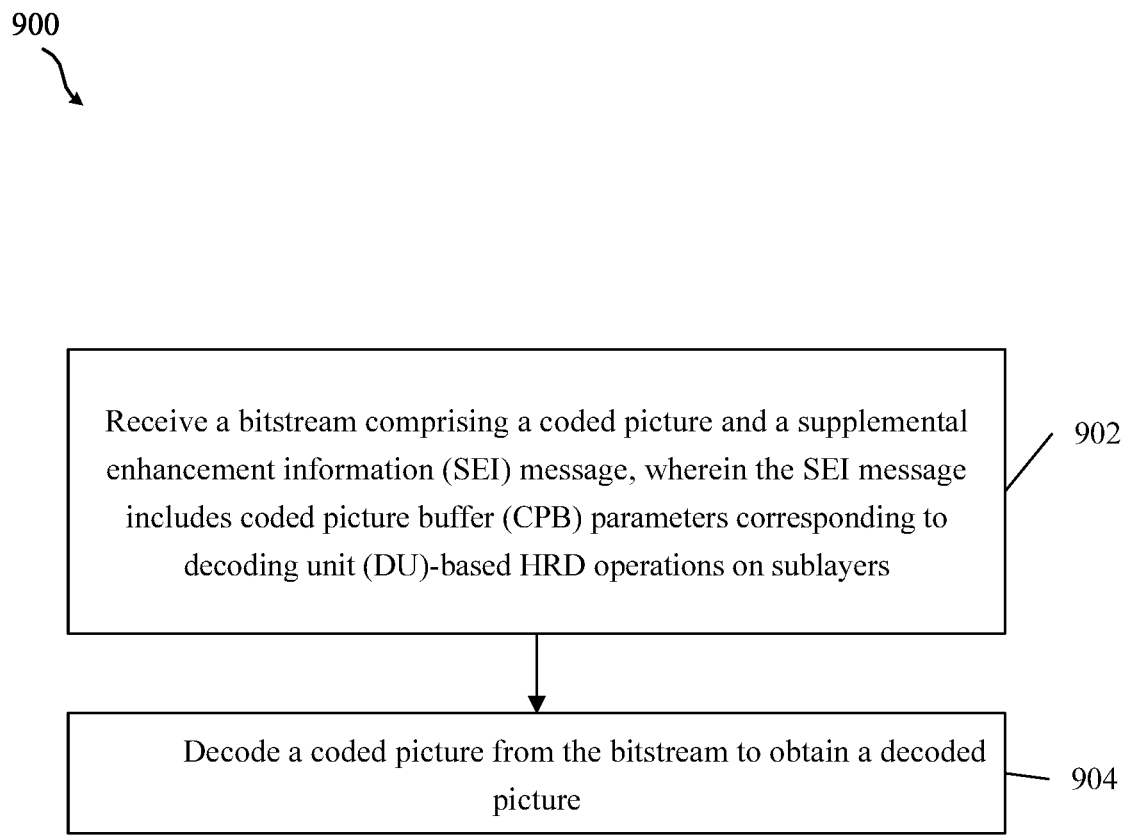
FIG. 9 is an embodiment of a method of decoding a coded video bitstream.

FIG. 9 is an embodiment of a method 900 of decoding implemented by a video decoder (e.g., video decoder 400). The method 900 may be performed after a bitstream has been directly or indirectly received from a video encoder (e.g., video encoder 300). The method 900 improves the decoding process by ensuring picture-level coded picture buffer (CPB) parameters used to perform DU-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

In block 902, the video decoder receives a bitstream comprising a coded picture and an SEI message. The SEI message includes CPB parameters (e.g., the HRD parameters 880 and/or 890 referred to as picture-level CPB parameters) used to perform DU-based HRD operations on sublayers (e.g., sublayers 710, 720, 730). The DU-based HRD operations, which correspond to a DU such as DU 822, are different from AU-based HRD operations, which correspond to an AU such as AU 821. As noted above, the DU-based HRD operations are implemented by an HRD (e.g., HRD 500) for the purpose of testing for a bitstream such as bitstream 800, which includes a multi-layer video sequence 600 and/or a multi-layer video sequence 700, for bitstream conformance.

In an embodiment, the CPB parameters specify a duration between CPB removal times of two decoding units. In an embodiment, the SEI message is a picture timing (PT) SEI message. In an embodiment, the CPB parameters comprise a common CPB removal delay and a CPB removal delay for AU associated with the PT SEI message.

In an embodiment, the SEI message is a PT SEI message that specifies a number of decoding units in the AU associated with the PT SEI message. In an embodiment, the SEI message is a PT SEI message that specifies a number of NAL units in a DU of the AU associated with the PT SEI message. As used herein, the highest sublayer is the enhancement layer (e.g., sublayer 730) furthest away from the base layer (e.g., sublayer 710).

In an embodiment, the SEI message is a decoding unit information (DUI) SEI message that provides a temporal ID of an SEI NAL unit containing the DUI SEI message. In an embodiment, the temporal ID specifies a highest sublayer for which CPB removal delay information is contained in the DUI SEI message.

In block 904, the video decoder decodes the coded picture from the bitstream to obtain a decoded picture. Thereafter, the decoded picture may be used to generate or produce an image or video sequence for display to a user on the display or screen of an electronic device (e.g., a smart phone, tablet, laptop, personal computer, etc.). In an embodiment, the picture-level CPB parameters contained in the PT SEI message 818 and/or the DUI SEI message 816 are not used in decoding the coded picture.

Figure 10:
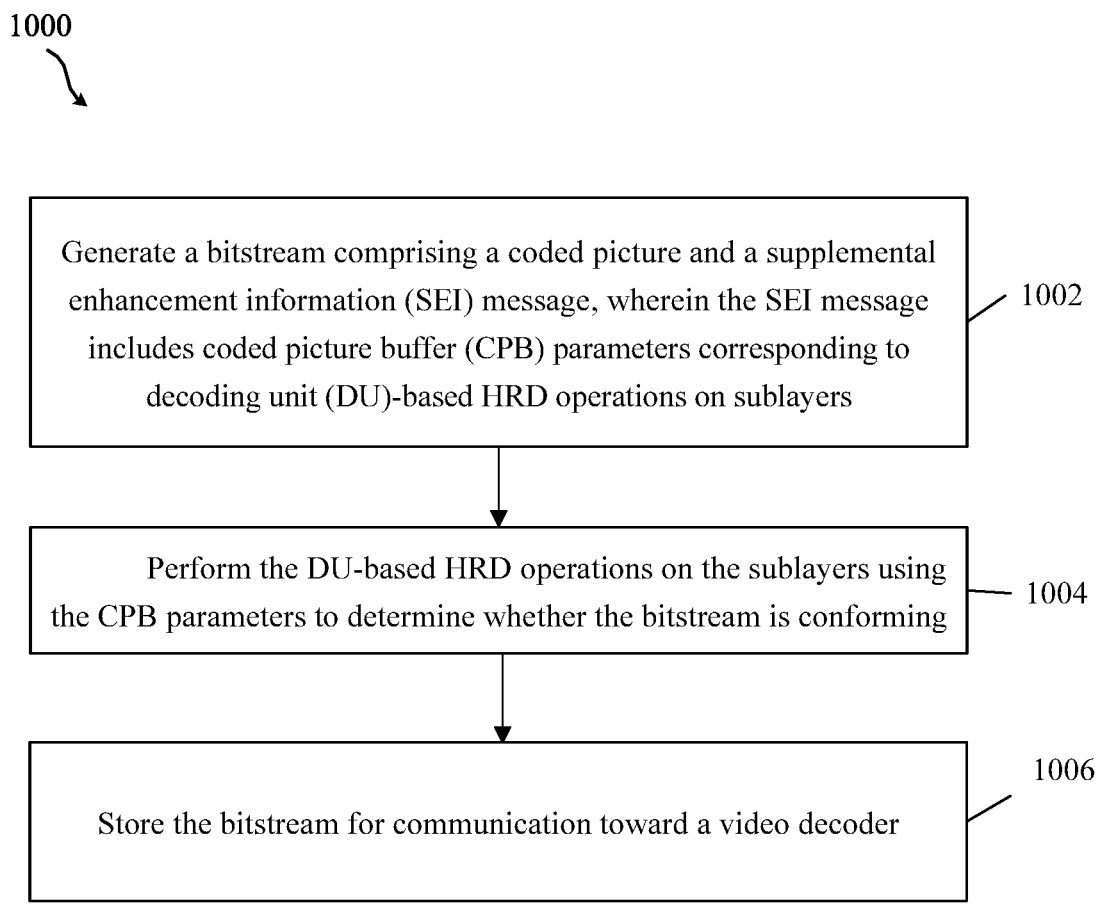
FIG. 10 is an embodiment of a method of encoding a video bitstream.

FIG. 10 is an embodiment of a method 1000 of encoding a video bitstream implemented by a video encoder (e.g., video encoder 300). The method 1000 may be performed when a picture (e.g., from a video) is to be encoded into a video bitstream and then transmitted toward a video decoder (e.g., video decoder 400). The method 1000 improves the encoding process by ensuring picture-level coded picture buffer (CPB) parameters used to perform DU-based HRD operations on sublayers are included in a supplemental enhancement information (SEI) message. Because the picture-level CPB parameters are included in the SEI message, the HRD can use the DU-based HRD operations to test the sublayers in the bitstream for bitstream conformance, which ensures that the sublayers are properly coded and/or can be properly decoded. Thus, the coder/decoder (a.k.a., "codec") in video coding is improved relative to current codecs. As a practical matter, the improved video coding process offers the user a better user experience when videos are sent, received, and/or viewed.

In block 1002, the video encoder generates a bitstream comprising a coded picture and an SEI message. The SEI message includes CPB parameters (e.g., the HRD parameters 880 and/or 890 referred to as picture-level CPB parameters) used to perform DU-based HRD operations on sublayers (e.g., sublayers 710, 720, 730). The DU-based HRD operations, which correspond to a DU such as DU 822, are different from AU-based HRD operations, which correspond to an AU such as AU 821. As noted above, the DU-based HRD operations are implemented by an HRD (e.g., HRD 500) for the purpose of testing for a bitstream such as bitstream 800, which includes a multi-layer video sequence 600 and/or a multi-layer video sequence 700, for bitstream conformance.

In an embodiment, the CPB parameters specify a duration between CPB removal times of two decoding units. In an embodiment, the SEI message is a picture timing (PT) SEI message. In an embodiment, the CPB parameters comprise a common CPB removal delay and a CPB removal delay for an access unit (AU) associated with the PT SEI message. In an embodiment, the PT SEI message specifies a number of decoding units in the AU associated with the PT SEI message and a number of network abstraction layer (NAL) units in a decoding unit (DU) of the AU associated with the PT SEI message.

In an embodiment, the SEI message is a decoding unit information (DUI) SEI message that provides a temporal identifier (ID) of an SEI NAL unit containing the DUI SEI message. In an embodiment, the DUI SEI message specifies a temporal identifier (ID) of a highest sublayer for which CPB removal delay information is contained in the DUI SEI message.

In block 1004, the video encoder performs the DU-based HRD operations on the sublayers using the CPB parameters to determine whether the bitstream is conforming.

In an embodiment, the bitstream is conforming when the duration between the CPB removal times is not exceeded.

In block 1006, the video encoder stores the bitstream for communication toward a video decoder when the bitstream is conforming based on performance of the DU-based HRD operations. The bitstream may be stored in memory until the bitstream is transmitted toward the video decoder. Once received by the video decoder, the encoded bitstream may be decoded (e.g., as described above) to generate or produce an image or video sequence for display to a user on the display or screen of an electronic device (e.g., a smart phone, tablet, laptop, personal computer, etc.).

Figure 11:
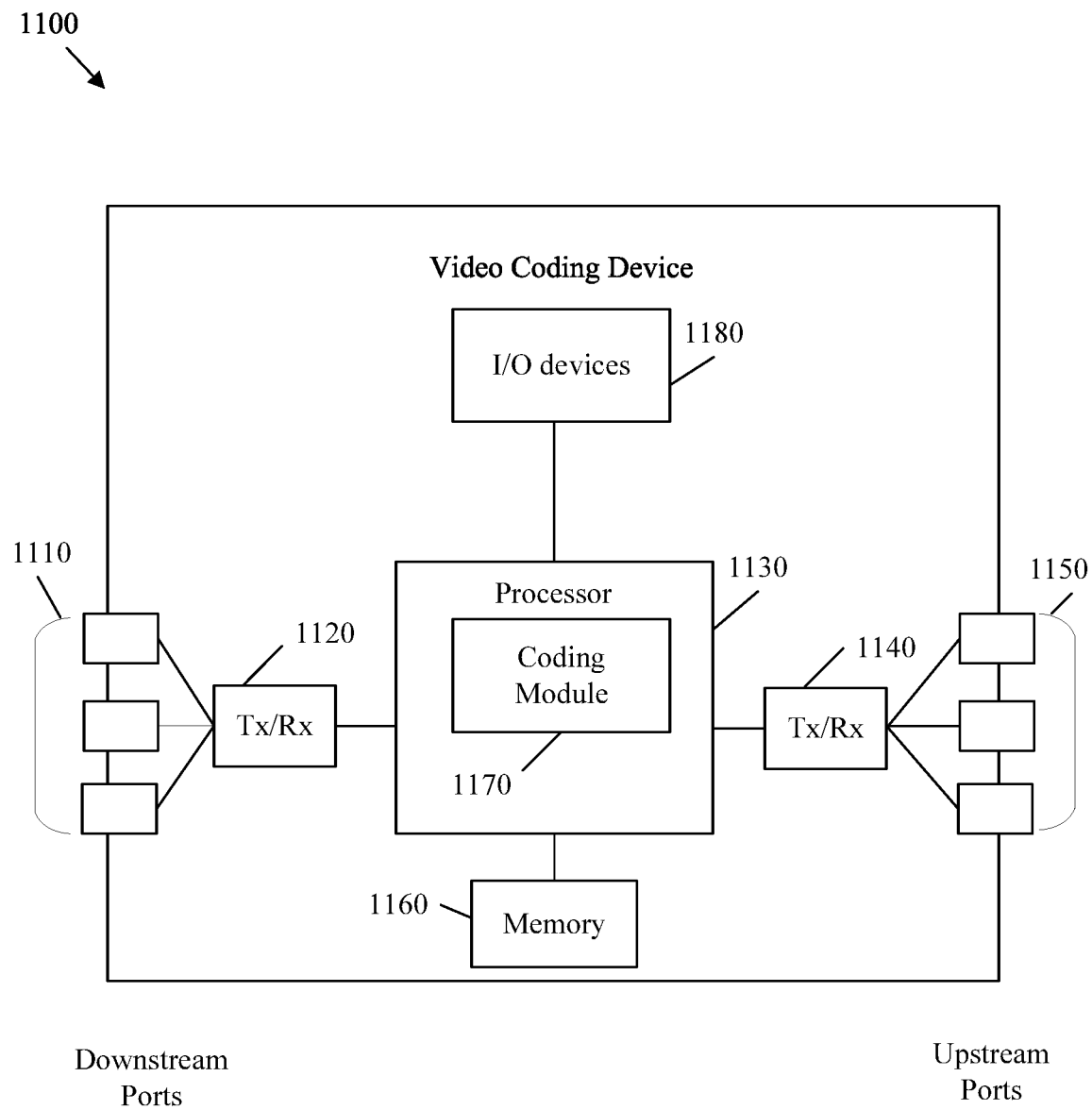
FIG. 11 is a schematic diagram of a video coding device.

FIG. 11 is a schematic diagram of a video coding device 1100 (e.g., a video encoder 300 or a video decoder 400) according to an embodiment of the disclosure. The video coding device 1100 is suitable for implementing the disclosed embodiments as described herein. The video coding device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The video coding device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a coding module 1170. The coding module 1170 implements the disclosed embodiments described above. For instance, the coding module 1170 implements, processes, prepares, or provides the various codec functions. The inclusion of the coding module 1170 therefore provides a substantial improvement to the functionality of the video coding device 1100 and effects a transformation of the video coding device 1100 to a different state. Alternatively, the coding module 1170 is implemented as instructions stored in the memory 1160 and executed by the processor 1130.

The video coding device 1100 may also include input and/or output (I/O) devices 1180 for communicating data to and from a user. The I/O devices 1180 may include output devices such as a display for displaying video data, speakers for outputting audio data, etc. The I/O devices 1180 may also include input devices, such as a keyboard, mouse, trackball, etc., and/or corresponding interfaces for interacting with such output devices.

The memory 1160 comprises one or more disks, tape drives, and solid-state drives and may be used as an overflow data storage device, to store programs when such programs are selected for execution, and to store instructions and data that are read during program execution. The memory 1160 may be volatile and/or non-volatile and may be read-only memory (ROM), random access memory (RAM), ternary content-addressable memory (TCAM), and/or static random-access memory (SRAM).

Figure 12:
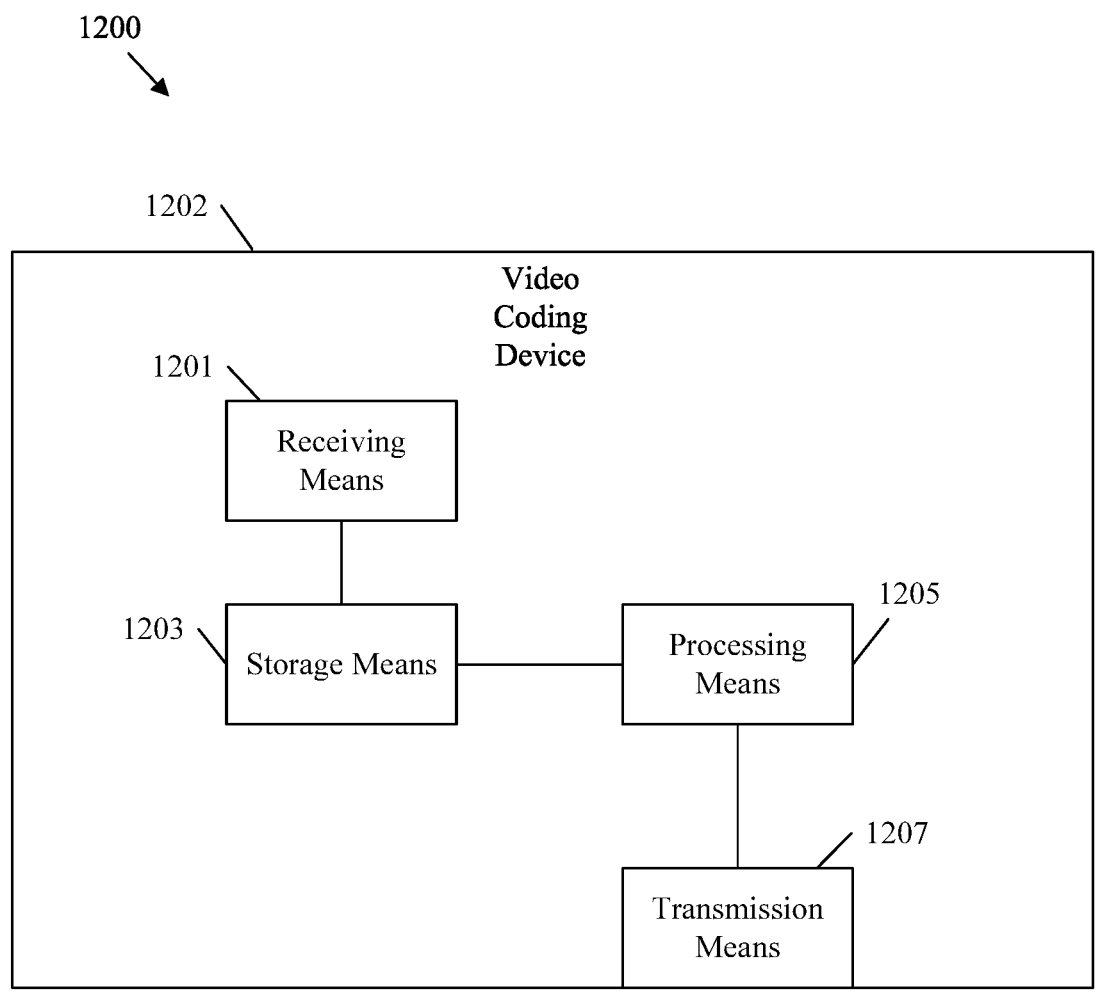
FIG. 12 is a schematic diagram of an embodiment of a means for coding.

FIG. 12 is a schematic diagram of an embodiment of a means for coding 1200. In an embodiment, the means for coding 1200 is implemented in a video coding device 1202 (e.g., a video encoder 300 or a video decoder 400). The video coding device 1202 includes receiving means 1201. The receiving means 1201 is configured to receive a picture to encode or to receive a bitstream to decode. The video coding device 1202 includes transmission means 1207 coupled to the receiving means 1201. The transmission means 1207 is configured to transmit the bitstream to a decoder or to transmit a decoded image to a display means (e.g., one of the I/O devices 1180).

The video coding device 1202 includes a storage means 1203. The storage means 1203 is coupled to at least one of the receiving means 1201 or the transmission means 1207. The storage means 1203 is configured to store instructions. The video coding device 1202 also includes processing means 1205. The processing means 1205 is coupled to the storage means 1203. The processing means 1205 is configured to execute the instructions stored in the storage means 1203 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a video decoder, comprising:
   receiving a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers, wherein each of the sublayers comprises a temporal scalable layer including video coding layer (VCL) network abstraction layer (NAL) units with a particular value of a temporal identifier (TemporalId) and associated non-VCL NAL units; and
   decoding the coded picture from the bitstream to obtain a decoded picture.

2. The method of claim 1, wherein the CPB parameters specify a duration between CPB removal times of two decoding units.

3. The method of claim 1, wherein the SEI message is a picture timing (PT) SEI message.

4. The method of claim 3, wherein the CPB parameters comprise a common CPB removal delay increment and a CPB removal delay increment for an access unit (AU) associated with the PT SEI message.

5. The method of claim 1, wherein the SEI message is a picture timing (PT) SEI message that specifies a number of decoding units in an access unit (AU) associated with the PT SEI message.

6. The method of claim 1, wherein the SEI message is a picture timing (PT) SEI message that specifies a number of NAL units in a decoding unit (DU) of an access unit (AU) associated with the PT SEI message.

7. The method of claim 1, wherein the SEI message is a decoding unit information (DUI) SEI message that provides a temporal identifier (ID) of an SEI NAL unit containing the DUI SEI message.

8. The method of claim 7, wherein the temporal ID specifies a highest sublayer for which CPB removal delay information is contained in the DUI SEI message.

9. The method of claim 1, further comprising displaying the decoded picture on a display of an electronic device.

10. A method implemented by a video encoder, comprising:
    generating a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers, wherein each of the sublayers comprises a temporal scalable layer including video coding layer (VCL) network abstraction layer (NAL) units with a particular value of a temporal identifier (TemporalId) and associated non-VCL NAL units;
    performing the DU-based HRD operations on the sublayers using the CPB parameters to determine whether the bitstream is conforming; and
    storing the bitstream for communication toward a video decoder when the bitstream is conforming based on performance of the DU-based HRD operations.

11. The method of claim 10, wherein the CPB parameters specify a duration between CPB removal times of two decoding units, and wherein the bitstream is conforming when the duration between the CPB removal times is not exceeded.

12. The method of claim 10, wherein the SEI message is a picture timing (PT) SEI message.

13. The method of claim 12, wherein the CPB parameters comprise a common CPB removal delay and a CPB removal delay for an access unit (AU) associated with the PT SEI message.

14. The method of claim 13, wherein the PT SEI message specifies a number of decoding units in the AU associated with the PT SEI message and a number of NAL units in a decoding unit (DU) of the AU associated with the PT SEI message.

15. The method of claim 10, wherein the SEI message is a decoding unit information (DUI) SEI message that provides a temporal identifier (ID) of an SEI NAL unit containing the DUI SEI message.

16. The method of claim 15, wherein the DUI SEI message specifies the temporal ID of a highest sublayer for which CPB removal delay information is contained in the DUI SEI message.

17. A decoding device, comprising:
    a receiver configured to receive a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers, wherein each of the sublayers comprises a temporal scalable layer including video coding layer (VCL) network abstraction layer (NAL) units with a particular value of a temporal identifier (TemporalId) and associated non-VCL NAL units;
    a memory coupled to the receiver, the memory storing instructions; and
    one or more processors coupled to the memory, the one or more processors configured to execute the instructions to cause the decoding device to decode the coded picture from the bitstream to obtain a decoded picture.

18. The decoding device of claim 17, wherein the CPB parameters specify a duration between CPB removal times of two decoding units.

19. The decoding device of claim 17, wherein the SEI message is a picture timing (PT) SEI message that specifies a number of decoding units in an access unit (AU) associated with the PT SEI message, and wherein the CPB parameters comprise a common CPB removal delay and a CPB removal delay for the AU associated with the PT SEI message.

20. The decoding device of claim 17, wherein the SEI message is a decoding unit information (DUI) SEI message that provides a temporal identifier (ID) of an SEI NAL unit containing the DUI SEI message.

21. The decoding device of claim 20, wherein the temporal ID specifies a highest sublayer for which CPB removal delay information is contained in the DUI SEI message.

22. An encoding device, comprising:
a memory containing instructions;
one or more processors coupled to the memory, the one or more processors configured to implement the instructions to cause the encoding device to:
generate a bitstream comprising a coded picture and a supplemental enhancement information (SEI) message, wherein the SEI message includes coded picture buffer (CPB) parameters corresponding to decoding unit (DU)-based hypothetical reference decoder (HRD) operations on sublayers, wherein each of the sublayers comprises a temporal scalable layer including video coding layer (VCL) network abstraction layer (NAL) units with a particular value of a temporal identifier (TemporalId) and associated non-VCL NAL units;
perform the DU-based HRD operations on the sublayers using the CPB parameters to determine whether the bitstream is conforming; and
a transmitter coupled to the one or more processors, the transmitter configured to transmit the bitstream toward a video decoder when the bitstream is conforming based on performance of the DU-based HRD operations.

23. The encoding device of claim 22, wherein the CPB parameters specify a duration between CPB removal times of two decoding units, and wherein the bitstream is conforming when the duration between the CPB removal times is not exceeded.

24. The encoding device of claim 22, wherein the SEI message is a picture timing (PT) SEI message.

25. The encoding device of claim 24, wherein the CPB parameters comprise a common CPB removal delay and a CPB removal delay for an access unit (AU) associated with the PT SEI message.

26. The encoding device of claim 24, wherein the PT SEI message specifies a number of decoding units in an access unit (AU) associated with the PT SEI message and a number of NAL units in a decoding unit (DU) of the AU associated with the PT SEI message.

27. The encoding device of claim 22, wherein the SEI message is a decoding unit information (DUI) SEI message that provides a temporal identifier (ID) of an SEI NAL unit containing the DUI SEI message.

28. The encoding device of claim 27, wherein the DUI SEI message specifies a temporal identifier (ID) of a highest sublayer for which CPB removal delay information is contained in the DUI SEI message.

* * * * *